(12) United States Patent
Lee

(10) Patent No.: US 10,936,484 B2
(45) Date of Patent: Mar. 2, 2021

(54) MEMORY SYSTEM AND OPERATING METHOD THEREOF

(71) Applicant: SK hynix Inc., Gyeonggi-do (KR)

(72) Inventor: Jong-Min Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/425,065

(22) Filed: May 29, 2019

(65) Prior Publication Data

US 2020/0097401 A1    Mar. 26, 2020

(30) Foreign Application Priority Data

Sep. 20, 2018 (KR) .......................... 10-2018-0112756

(51) Int. Cl.
   *G06F 12/02* (2006.01)
(52) U.S. Cl.
   CPC .. *G06F 12/0253* (2013.01); *G06F 2212/1044* (2013.01)
(58) Field of Classification Search
   CPC ...... G06F 3/0652; G06F 3/064; G06F 3/0679; G06F 12/0253; G06F 2212/1044; G06F 3/061; G06F 2212/7205; G06F 12/0246; G06F 12/1044
   USPC ................................................. 711/154, 103
   See application file for complete search history.

(56) References Cited

U.S. PATENT DOCUMENTS

| | | | | |
|---|---|---|---|---|
| 2011/0022778 | A1* | 1/2011 | Schibilla ............. | G06F 12/0246 711/103 |
| 2011/0202812 | A1* | 8/2011 | Asano ................. | G06F 11/1068 714/747 |
| 2014/0032817 | A1* | 1/2014 | Bux ..................... | G06F 12/0261 711/103 |
| 2017/0123718 | A1* | 5/2017 | Sinha .................... | G06F 3/0653 |
| 2017/0286288 | A1* | 10/2017 | Higgins .............. | G06F 11/1048 |
| 2018/0121351 | A1* | 5/2018 | Zhang ...................... | G11C 8/06 |

FOREIGN PATENT DOCUMENTS

| | | |
|---|---|---|
| KR | 10-2013-0142103 | 12/2013 |
| KR | 10-2016-0044989 | 4/2016 |
| KR | 10-2016-0075229 | 6/2016 |
| KR | 10-2016-0110596 | 9/2016 |

\* cited by examiner

*Primary Examiner* — Hashem Farrokh
(74) *Attorney, Agent, or Firm* — IP & T Group LLP

(57) ABSTRACT

A memory system includes: a memory device including super memory blocks each having a plurality of memory blocks; a garbage collection operation time manager suitable for determining an operation time of a garbage collection operation according to a number of valid pages, distribution of the valid pages and distribution of logical addresses of the valid pages; and a garbage collection operation module suitable for controlling the memory device to perform the garbage collection operation within the determined operation time.

18 Claims, 19 Drawing Sheets

|  | Column 1 | Column 2 | Column 3 | Column 4 |
|---|---|---|---|---|
| Index 1 | 1 | 1 | 1 | 1 |
| Index 2 | 0 | 0 | 1 | 0 |
| Index 3 | 1 | 1 | 0 | 0 |
| Index 4 | 0 | 0 | 0 | 0 |

Valid - 1
Invalid - 0

FIG. 10
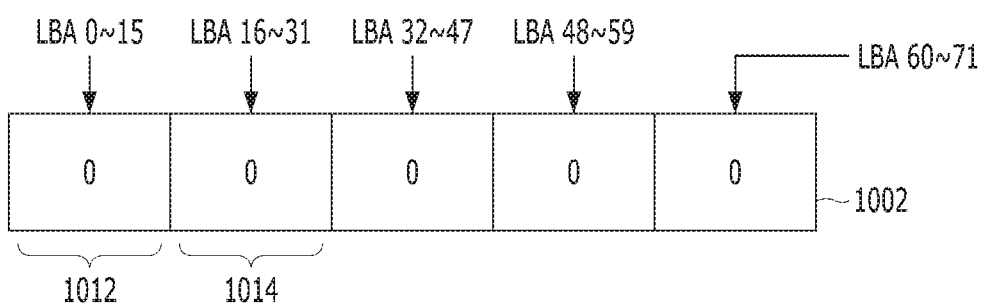
<CASE 1>
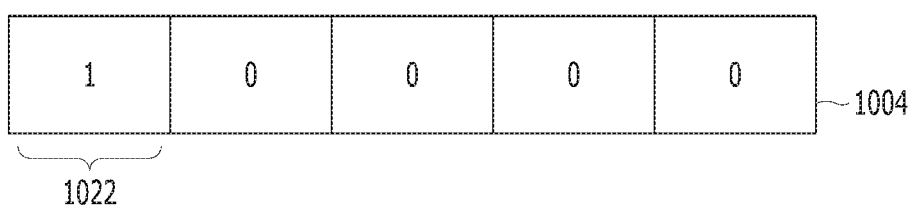
<CASE 2>
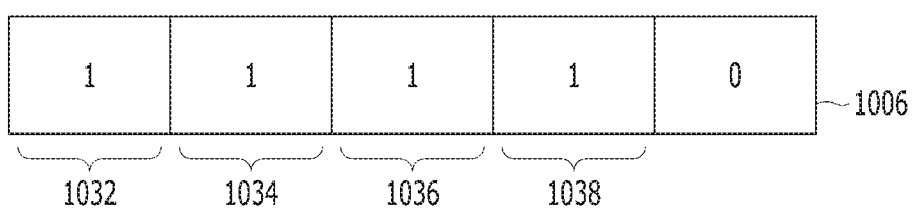

MEMORY SYSTEM AND OPERATING METHOD THEREOF

CROSS-REFERENCE TO RELATED APPLICATION

The present application claims priority under 35 U.S.C. § 119(a) to Korean Patent Application No. 10-2018-0112756, filed on Sep. 20, 2018, which is incorporated herein by reference in its entirety.

BACKGROUND

1. Field

Various embodiments of the present invention relate to a memory system and, more particularly, to a memory system capable of effectively performing a garbage collection operation and an operating method thereof.

2. Description of the Related Art

The computer environment paradigm has shifted to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Memory systems provide excellent stability, durability, high information access speed, and low power consumption since they have no moving parts, as compared with a hard disk device. Examples of memory systems having such advantages include universal serial bus (USB) memory devices, memory cards having various interfaces, and solid state drives (SSD).

SUMMARY

Various embodiments of the present invention are directed to a memory system capable of effectively performing a garbage collection operation by dynamically changing an operation time of the garbage collection operation according to a workload.

In an embodiment, a memory system may include: a memory device including super memory blocks each having a plurality of memory blocks; a garbage collection operation time manager suitable for determining an operation time of a garbage collection operation according to a number of valid pages, distribution of the valid pages and distribution of logical addresses of the valid pages; and a garbage collection operation module suitable for controlling the memory device to perform the garbage collection operation within the determined operation time.

In an embodiment, an operating method of a memory system may include: an operation time of a garbage collection operation according to a number of valid pages, distribution of the valid pages and distribution of logical addresses of the valid pages; and controlling the memory device to perform the garbage collection operation within the determined operation time.

In an embodiment, a memory system may include: a memory device including at least a victim super memory block; and a controller suitable for controlling the memory device to perform a garbage collection operation on the victim super memory block within an adjustable operation time based on a number and distribution of valid pages within the victim super memory block and a degree of concentration of logical addresses of the valid pages.

BRIEF DESCRIPTION OF THE DRAWINGS

FIG. 10 is a diagram schematically illustrating map segment information in accordance with an embodiment of the present disclosure.

DETAILED DESCRIPTION

Figure 1:
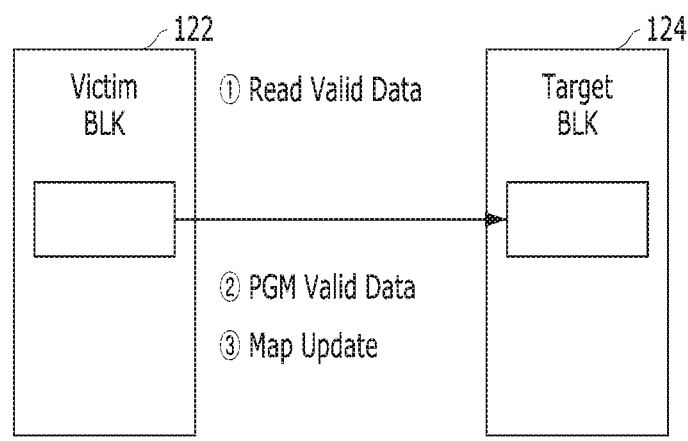
FIG. 1 is a diagram schematically illustrating a garbage collection operation.

Various embodiments of the present invention are described below in more detail with reference to the accompanying drawings. We note, however, that the present invention may be embodied in other forms, which may be variations of any of the disclosed embodiments. Thus, the present invention is not limited to the embodiments set forth herein. Rather, the described embodiments are provided so that this disclosure is thorough and complete and fully conveys the present invention to those skilled in the art to which this invention pertains. Throughout the disclosure, like reference numerals refer to like parts throughout the various figures and embodiments of the present invention. Also, throughout the specification, reference to "an embodiment," "another embodiment" or the like is not necessarily to only one embodiment, and different references to any such phrase are not necessarily to the same embodiment(s).

It will be understood that, although the terms "first", "second", "third", and so on may be used herein to identify various elements, these elements are not limited by these terms. These terms are used to distinguish one element from another element that otherwise have the same or similar names. Thus, a first element in one instance could be termed as a second or third element in another instance without departing from the spirit and scope of the present invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via an intervening element therebetween.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present. Communication between two elements, whether directly or indirectly connected/coupled, may be wired or wireless, unless the context indicates otherwise.

The terminology used herein is for the purpose of describing particular embodiments only and is not intended to be limiting of the present invention.

As used herein, singular forms are intended to include the plural forms and vice versa, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention pertains in view of the present disclosure. It will be further understood that terms, such as those defined in commonly used dictionaries, should be interpreted as having a meaning that is consistent with their meaning in the context of the present disclosure and the relevant art and not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a diagram schematically illustrating a garbage collection operation.

A flash memory device performs program and read operations by units of pages, performs an erase operation by units of memory blocks and does not support an overwrite operation, which is different from a hard disk system. Therefore, in order to change original data programmed in a page, the flash memory device programs a changed version of the original data into another page and invalidates the original data.

During a garbage collection operation, invalidated pages are periodically emptied to become empty pages in order to prevent waste of memory space of the flash memory device, which is caused due to the pages invalidated in the course of the change of the original data. The garbage collection operation comprises reading valid data programmed in a valid page within a victim memory block 122; programming the valid data into an empty page within a target memory block 124; and updating address information (which may be referred to as map information) of the valid data. Although the victim memory block 122 is illustrated as an individual memory block, the victim memory block 122 may be a super memory block including a plurality of individual memory blocks.

According to prior art, a flash memory device periodically performs a garbage collection operation for a fixed time. On the other hand, a read count of reading the valid data and a program count of programming the valid data become greater as a size of the valid data or a number of the valid pages becomes greater within the victim memory block 122. Therefore, the times required to read and program the valid data become greater as a size of the valid data or a number of the valid pages becomes greater within the victim memory block 122.

Also, a number of map segments corresponding to the valid page becomes greater as logical addresses of the valid pages becomes more random. Further, the flash memory device performs the map update operation for the valid page by units of map segments. Therefore, the time required to update the map segments corresponding to the valid page becomes greater as the number of map segments corresponding to the valid page becomes greater.

According to prior art, a flash memory device performs a garbage collection operation for the fixed time regardless of the number of the valid pages and the sequence or concentration of the logical addresses of the valid pages. There is a concern that the flash memory device cannot complete the garbage collection operation for all victim memory blocks thereof within the fixed time and thus cannot secure sufficient memory space when there are a great number of valid pages or the logical addresses of the valid pages are too random.

In accordance with an embodiment of the present disclosure, a controller may dynamically change the operation time of the garbage collection operation according to the number of valid pages, distribution of the valid pages and a degree of sequence or concentration of map information. The controller may control the garbage collection operation of a memory device during the changed operation time of the garbage collection operation thereby completing the garbage collection operation for all victim memory blocks of the memory device within the changed operation time of the garbage collection operation.

Figure 2:
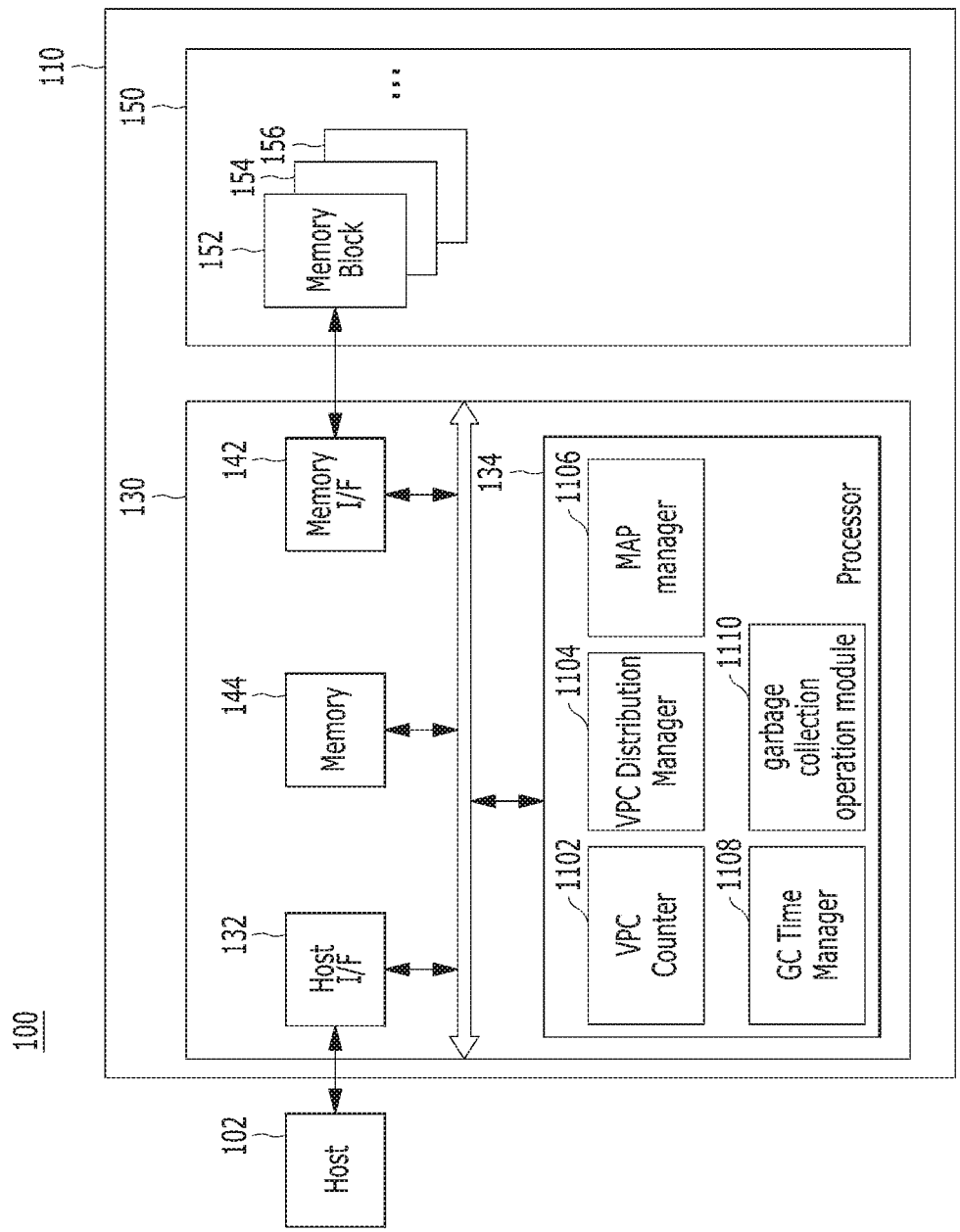
FIG. 2 is a block diagram illustrating a data processing system including a memory system in accordance with an embodiment of the present invention.

FIG. 2 is a block diagram illustrating a data processing system 100 including a memory system 110 in accordance with an embodiment of the present invention.

Referring to FIG. 2, the data processing system 100 may include a host 102 operatively coupled to the memory system 110.

The host 102 may include any of a variety of portable electronic devices such as a mobile phone, a MP3 player and a laptop computer, or any of a variety of non-portable electronic devices such as a desktop computer, a game machine, a TV and a projector.

The host 102 may include at least one OS (operating system) or a plurality of operating systems. The host 102 may execute an OS to perform an operation corresponding to a user's request on the memory system 110. Here, the host 102 may provide a plurality of commands corresponding to a user's request to the memory system 110. Thus, the memory system 110 may perform certain operations corresponding to the plurality of commands, that is, corresponding to the user's request. The OS may manage and control overall functions and operations of the host 102. The OS may support an operation between the host 102 and a user using the data processing system 100 or the memory system 110.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Non-limiting examples of the memory system 110 include a solid state drive (SSD), a multi-media card (MMC) and an embedded MMC (eMMC).

The memory system 110 may include various types of storage devices. Non-limiting examples of such storage devices include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM), and a flash memory.

The memory system 110 may include a memory device 150 and a controller 130.

The controller 130 and the memory device 150 may be integrated into a single semiconductor device, which may be included in any of the various types of memory systems as described above. For example, the controller 130 and the memory device 150 may be integrated as a single semiconductor device to constitute an SSD, a personal computer memory card international association (PCMCIA) card, SD card including a mini-SD, a micro-SD and a SDHC, and an UFS device. The memory system 110 may be configured as a part of a computer, a smart phone, a portable game player, or one of various components configuring a computing system.

The memory device 150 may be a nonvolatile memory device which may retain stored data even though power s not supplied. The memory device 150 may store data provided from the host 102 through a write operation, and output data stored therein to the host 102 through a read operation. In an embodiment, the memory device 150 may include a plurality of memory dies (not shown), and each memory die may include a plurality of planes (not shown). Each plane may include a plurality of memory blocks 152 to 156, each of which may include a plurality of pages, each of which may include a plurality of memory cells coupled to a word line. In an embodiment, the memory device 150 may be a flash memory having a 3-dimensional (3D) stack structure.

The structure of the memory device 150 including a 3 dimensional stack structure of the memory device 150 is described later with reference to FIGS. 14 to 16.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

More specifically, the controller 130 may include a host interface (I/F) 132, a processor 134, a memory interface 142, and a memory 144, all operatively coupled or engaged via an internal bus. Also, the processor 134 may include a valid page number counter 1102, a valid page distribution manager 1104, a map manager 1106, a garbage collection operation time manager 1108 and a garbage collection operation module 1110, as described later with reference to FIG. 11.

The host interface 132 may process a command and data of the host 102. The host interface 132 may communicate with the host 102 through one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (PATA), enhanced small disk interface (ESDI) and integrated drive electronics (IDE). The host interface 132 may be driven via firmware, that is, a host interface layer (HIL) for exchanging data with the host 102.

The memory interface 142 may serve as a memory/storage interface between the controller 130 and the memory device 150 such that the controller 130 may control the memory device 150 in response to a request from the host 102.

The memory 144 may serve as a working memory of the memory system 110 and the controller 130, and store data for driving the memory system 110 and the controller 130.

The memory 144 may be a volatile memory. For example, the memory 144 may be a static random access memory (SRAM) or dynamic random access memory (DRAM). The memory 144 may be disposed within or external to the controller 130. FIG. 1 shows the memory 144 disposed within the controller 130. In another embodiment, the memory 144 may be an external volatile memory having a memory interface for transferring data between the memory 144 and the controller 130.

As described above, the memory 144 may include a program memory, a data memory, a write buffer/cache, a read buffer/cache, a data buffer/cache and a map buffer/cache to store some data required to perform data write and read operations between the host 102 and the memory device 150 and other data required for the controller 130 and the memory device 150 to perform these operations.

The processor 134 may control overall operations of the memory system 110. The processor 134 may use firmware to control the overall operations of the memory system 110.

The firmware may be referred to as flash translation layer (FTL). The processor 134 may be implemented with a microprocessor or a central processing unit (CPU). The detail of the processor 134 will be described later with reference to FIGS. 11 to 13.

For example, the controller 130 may perform an operation requested by the host 102 in the memory device 150 through the processor 134, which is implemented as a microprocessor, a CPU, or the like. Also, the controller 130 may perform a background operation on the memory device 150 through the processor 134, which may be realized as a microprocessor or a CPU. The background operation performed on the memory device 150 may include an operation of copying and processing data stored in some memory blocks among the memory blocks 152 to 156 of the memory device 150 into other memory blocks, e.g., a garbage collection (GC) operation, an operation of swapping data among some of the memory blocks 152 to 156, e.g., a wear-leveling (WL) operation, an operation of storing the map data stored in the controller 130 in the memory blocks 152 to 156, e.g., a map flush operation, or an operation of managing bad blocks of the memory device 150, e.g., a bad block management operation of detecting and processing bad blocks among the memory blocks 152 to 156 in the memory device 150.

Figure 3:
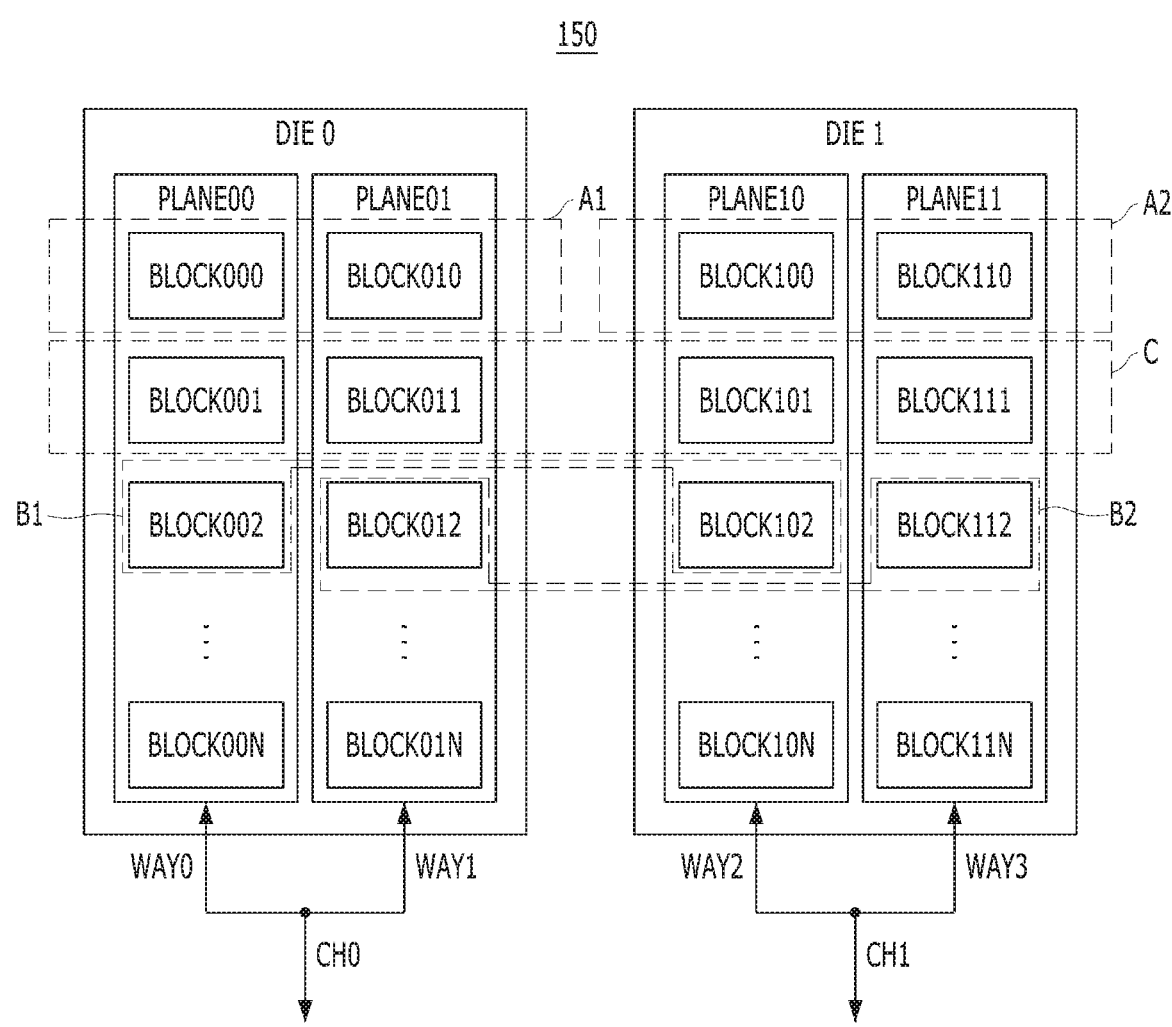
FIG. 3 is a diagram schematically illustrating formation of a super memory block of a memory system in accordance with an embodiment of the present disclosure.

FIG. 3 is a diagram illustrating a concept of a super memory block used in a memory system in accordance with an embodiment of the present invention.

FIG. 3 illustrates in detail certain elements of the memory device 150 among the elements of the memory system 110 shown in FIG. 2 in accordance with an embodiment of the present invention.

The memory device 150 may include a plurality of memory blocks BLOCK000 to BLOCK00N, BLOCK010 to BLOCK01N, BLOCK100 to BLOCK10N and BLOCK110 to BLOCK11N.

In addition, the memory device 150 may include a first memory die DIE0 capable of inputting/outputting data through a zeroth channel CH0 and a second memory die DIE1 capable of inputting/outputting data through a first channel CH1. The zeroth and first channels CH0 and CH1 may input/output data in an interleaving scheme.

The first memory die DIE0 may include a plurality of planes PLANE00 and PLANE01 respectively corresponding to a plurality of ways WAY0 and WAY1. The ways WAY0 and WAY1 may input/output data in the interleaving scheme by sharing the zeroth channel CH0.

The second memory die DIE1 may include a plurality of planes PLANE 10 and PLANE 11 respectively corresponding to a plurality of ways WAY2 and WAY3. The ways WAY2 and WAY3 may input/output data in the interleaving scheme by sharing the first channel CH1.

The first plane PLANE00 of the first memory die DIE0 may include a set number of memory blocks BLOCK000 to BLOCK00N among the plurality of memory blocks in the memory device 150.

The second plane PLANE01 of the first memory die DIE0 may include a set number of memory blocks BLOCK010 to BLOCK01N among the plurality of memory blocks in the memory device 150.

The first plane PLANE10 of the second memory die DIE1 may include a set number of memory blocks BLOCK100 to BLOCK10N among the plurality of memory blocks in the memory device 150.

The second plane PLANE11 of the second memory die DIE1 may include a set number of memory blocks BLOCK110 to BLOCK11N among the plurality of memory blocks in the memory device 150.

In this manner, the plurality of memory blocks in the memory device 150 may be divided into groups, according to their physical locations and their use of the ways and channels.

Although it is described above that two memory dies DIE0 and DIE1 are included in the memory device 150, two planes PLANE00 and PLANE01/PLANE10 and PLANE11 are included in the respective memory dies DIE0 and DIE1, and a particular number of memory blocks BLOCK000 to BLOCK00N, BLOCK010 to BLOCK01N, BLOCK100 to BLOCK10N and BLOCK110 to BLOCK11N are included in the respective planes PLANE00 and PLANE01/PLANE10 and PLANE11, the invention is not limited in this way. In actuality, any suitable number of memory dies, more or less than two, may be included in the memory device 150. The same is true for the number of planes that may be included in the respective memory dies. Any of various configurations of planes and dies may be used, according to system design considerations. Furthermore, the number of memory blocks included in the respective planes may be also adjusted according to such considerations.

Instead of dividing the memory blocks in the memory device 150 depending on their physical locations such as locations in the memory dies DIE0 and DIE1 and/or planes PLANE00 and PLANE01/PLANE10 and PLANE11, the controller 130 may divide the plurality of memory blocks on a basis of which memory blocks are simultaneously selected and operated. In other words, the controller 130 may manage a plurality of memory blocks which are located in different dies or different planes based on their physical locations, by grouping memory blocks capable of being selected simultaneously among the plurality of memory blocks and thereby dividing the grouped memory blocks into super memory blocks.

The simultaneous selection scheme of grouping the memory blocks into super memory blocks by the controller 130 may be performed in various ways according to the decision of the system designer. Herein, three simultaneous selection schemes are exemplified as follows.

A first scheme is to group an arbitrary memory block BLOCK000 from the first plane PLANE00 and an arbitrary memory block BLOCK010 from the second plane PLANE01 of the first memory die DIE0 and manage the grouped memory blocks BLOCK000 and BLOCK010 as a single super memory block A1. When the first way is applied to the second memory die DIE1, the controller 130 may group an arbitrary memory block BLOCK100 from the first plane PLANE10 and an arbitrary memory block BLOCK110 from the second plane PLANE11 of the second memory die DIE1 and manage the grouped memory blocks BLOCK100 and BLOCK110 as a single super memory block A2.

A second scheme is to group an arbitrary memory block BLOCK002 from the first plane PLANE00 of the first memory die DIE0 and an arbitrary memory block BLOCK102 from the first plane PLANE10 of the second memory die DIE1 and manage the grouped memory blocks BLOCK002 and BLOCK102 as a single super memory block B1. In addition, according to the second way, the controller 130 may group an arbitrary memory block BLOCK012 from the second plane PLANE01 of the first memory die DIE0 and an arbitrary memory block BLOCK112 from the second plane PLANE11 of the second memory die DIE1 and manage the grouped memory blocks BLOCK012 and BLOCK112 as a single super memory block B2.

A third scheme is to group an arbitrary memory block BLOCK001 from the first plane PLANE00 of the first memory die DIE0, an arbitrary memory block BLOCK011 from the second plane PLANE01 of the first memory die DIE0, an arbitrary memory block BLOCK101 from the first plane PLANE10 of the second memory die DIE1, and an arbitrary memory block BLOCK111 from the second plane PLANE11 of the second memory die DIE1 and manage the grouped memory blocks BLOCK001, BLOCK011, BLOCK101 and BLOCK111 as a single super memory block C.

The memory blocks included in the respective super memory blocks may be substantially simultaneously selected by the controller 130 through an interleaving scheme, for example, a channel interleaving scheme, a memory die interleaving scheme, a memory chip interleaving scheme or a way interleaving scheme.

Figure 4:
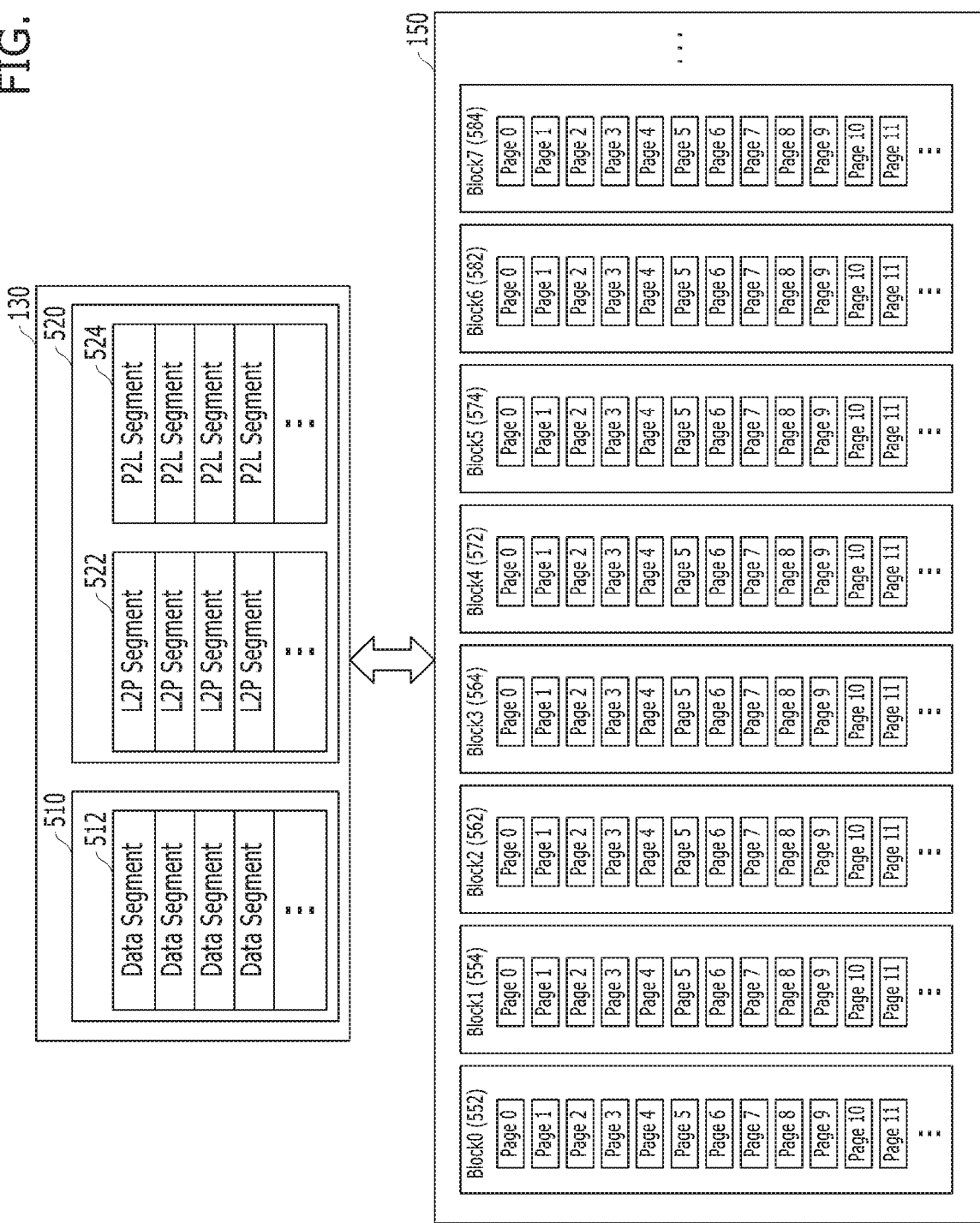
FIG. 4 is a diagram schematically illustrating a data processing operation on a memory device in the memory system in accordance with an embodiment of the present disclosure.

FIG. 4 is a diagram schematically illustrating a data processing operation of a memory system to a memory device in accordance with an embodiment of the present invention.

Referring to FIG. 4, the controller 130 may receive a program command, program data and logical addresses from the host 102. The controller 130 programs and stores the program data in the plurality of pages included in the memory blocks 552, 554, 562, 564, 572, 574, 582 and 584 of the memory device 150, in response to the program command.

The controller 130 generates and updates metadata for the program data, and programs and stores the metadata in the memory blocks 552, 554, 562, 564, 572, 574, 582 and 584 of the memory device 150. The metadata include logical/physical (L2P: logical to physical) information and physical/logical (P2L: physical to logical) information for the program data stored in the memory blocks 552, 554, 562, 564, 572, 574, 582 and 584. Also, the metadata may include information on command data corresponding to a command received from the host 102, information on a command operation corresponding to the command, information on the memory blocks of the memory device 150 for which the command operation is to be performed, and information on map data corresponding to the command operation. In other words, metadata may include all information and data except program data corresponding to a command received from the host 102.

The logical/physical (L2P: logical to physical) information and the physical/logical (P2L: physical to logical) information mean information in which physical addresses corresponding to the logical addresses are mapped by the controller 130 in response to the program command. The physical addresses may correspond to physical storage spaces of the memory device 150 where the program data received from the host 102 are to be stored.

The controller 130 may store the mapping information between the logical addresses and the physical addresses, that is, the logical/physical (L2P: logical to physical) information and the physical/logical (P2L: physical to logical) information, in at least one memory block among the memory blocks 552, 554, 562, 564, 572, 574, 582 and 584 of the memory device 150. The at least one memory block which stores the logical/physical (L2P: logical to physical) information and the physical/logical (P2L: physical to logical) information may be referred to as a system block.

For example, the controller 130 caches and buffers the program data corresponding to the program command received from the host 102, in a first buffer 510 in the memory 144 of the controller 130, that is, stores data segments 512 of user data in the first buffer 510 as a data buffer/cache. Thereafter, the controller 130 programs and stores the data segments 512 stored in the first buffer 510, in the pages in the memory blocks 552, 554, 562, 564, 572, 574, 582 and 584 of the memory device 150.

As the data segments 512 of the program data are programmed and stored in the pages in the memory blocks 552, 554, 562, 564, 572, 574, 582 and 584 of the memory device 150, the controller 130 generates L2P segments 522 and P2L segments 524 as metadata, and stores them in a second buffer 520 in the memory 144 of the controller 130. In the second buffer 520 of the memory 144 of the controller 130, the L2P segments 522 and the P2L segments 524 may be stored in the form of a list. Then, the controller 130 may program and store the L2P segments 522 and the P2L segments 524 stored in the second buffer 520, in the pages in the memory blocks 552, 554, 562, 564, 572, 574, 582 and 584 of the memory device 150, through a map flush operation.

Also, the controller 130 may receive a read command and logical addresses from the host 102. The controller 130 may read L2P segments 522 and P2L segments 524 corresponding to the logical addresses of the host 102 from the memory device 150 and load them in the second buffer 520, in response to the read command. Then, the controller 130 checks physical addresses of the memory device 150 corresponding to the logical addresses of the host 102 from the L2P segments 522 and the P2L segments 524 loaded in the second buffer 520, reads data segments 512 of user data from storage positions known through the checking, that is, specific pages of specific memory blocks among the memory blocks 552, 554, 562, 564, 572, 574, 582 and 584, stores the data segments 512 in the first buffer 510, and provides the data segments 512 to the host 102.

As described above, each time a read command and logical addresses are received from the host 102, the controller 130 may read L2P segments 522 and P2L segments 524 corresponding to the logical addresses of the host 102, and load them in the second buffer 520. As the operation of loading L2P segments 522 and P2L segments 524 in this way is repeated frequently, it may serve as a cause that degrades the read performance of the memory system 110.

The more the space of the second buffer 520 is secured, the more the controller 130 may load L2P segments 522 and P2L segments 524 from the memory device 150 at a time. As a result, even by one loading operation for L2P segments 522 and P2L segments 524, it is possible to process a plurality of read commands. Through this, the read performance of the memory system 110 may be improved.

L2P segments may be optimized to search physical addresses corresponding to specific logical addresses, and, as a result, may be efficient in searching physical addresses to be mapped to logical addresses inputted from the host 102, in a read operation.

Also, P2L segments 524 may be optimized for a program operation. The controller 130 may need to quickly allocate storage spaces in the memory device 150 for storing program data, when receiving a program command, program data and logical addresses from the host 102. In this regard, the controller 130 may load in advance a list of physical addresses corresponding to storage spaces in the memory device 150 which may be newly allocated, in the second buffer 520. Therefore, at a time when the program command, the program data and the logical addresses are received from the host 102, the controller 130 may quickly search the list of physical addresses loaded in the second buffer 520, may map physical addresses corresponding to storages spaces capable of storing the program data, with the logical addresses, and may then store the program data in the storage spaces corresponding to the physical addresses. P2L segments 524 may be generated and be temporarily stored in the second buffer 520. The P2L segments 524 stored in the second buffer 520 may be stored in the memory device 150 through a map flush operation.

Figure 5:
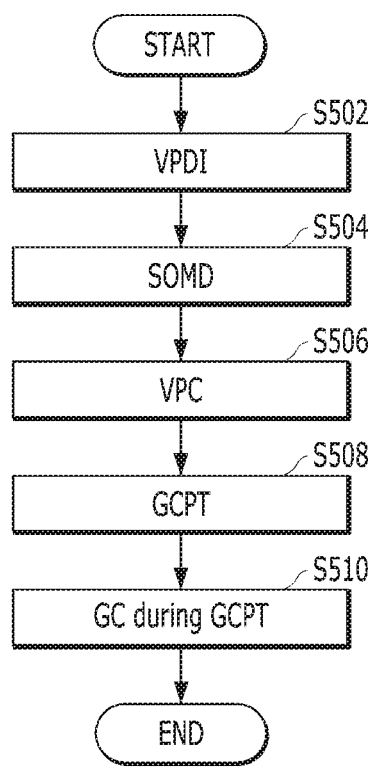
FIG. 5 is a flowchart schematically illustrating an operation of the memory system in accordance with an embodiment of the present disclosure.

FIG. 5 is a flowchart schematically illustrating an operation of the memory system 110 in accordance with an embodiment of the present disclosure.

At step S502, the processor 134 may generate valid page distribution information (VPDI) representing distribution of valid pages included in detected victim memory blocks. In accordance with an embodiment of the present disclosure, when the processor 134 controls the memory device 150 to read data programmed in the super memory block described with reference to FIG. 3, the processor 134 may control the memory device 150 to simultaneously read data programmed in pages of the same index among pages within each of different memory blocks. Therefore, there may be a greater number of read operations of reading data programmed in the same number of valid pages, which are in a super memory block detected as the victim memory block, when the valid pages are more randomly distributed than when the valid pages are concentrated at a particular index. The processor 134 may generate the valid page distribution information (VPDI) by counting a number of indexes of valid pages within the super memory block detected as the victim memory block.

Figure 6A:
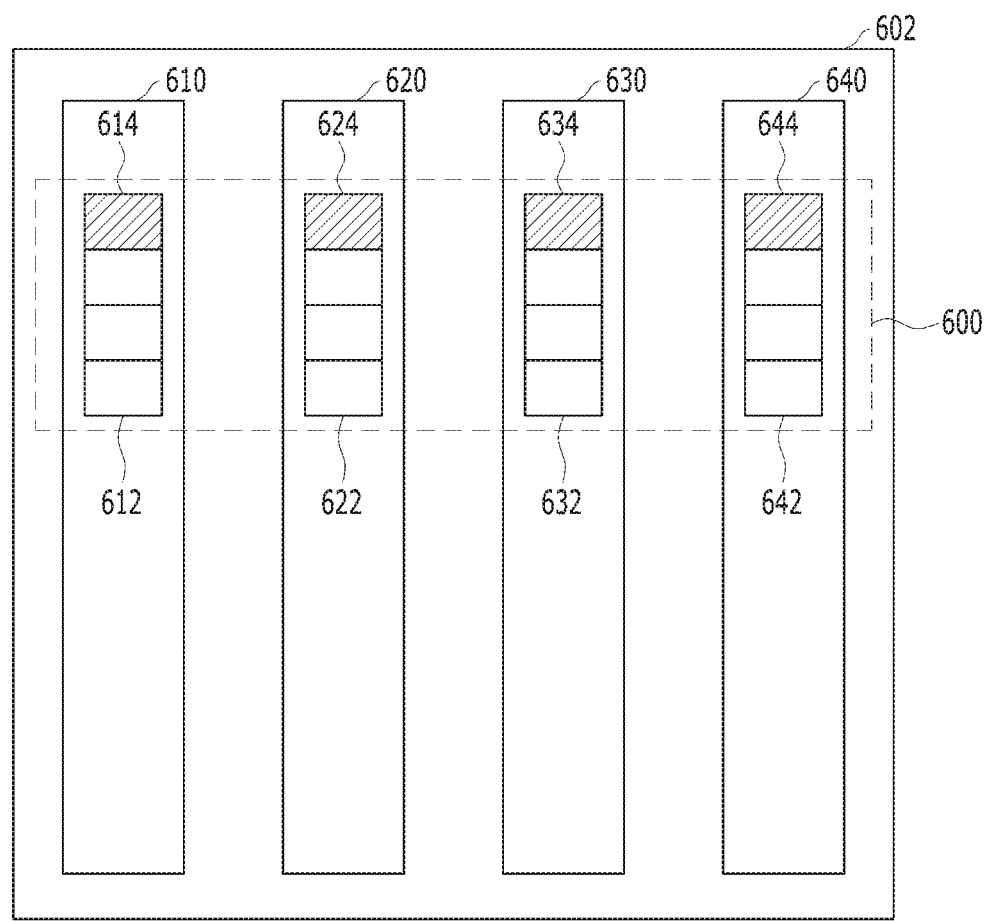
FIGS. 6A and 6B are diagrams schematically illustrating distribution of valid pages in a super memory block.
Figure 6B:
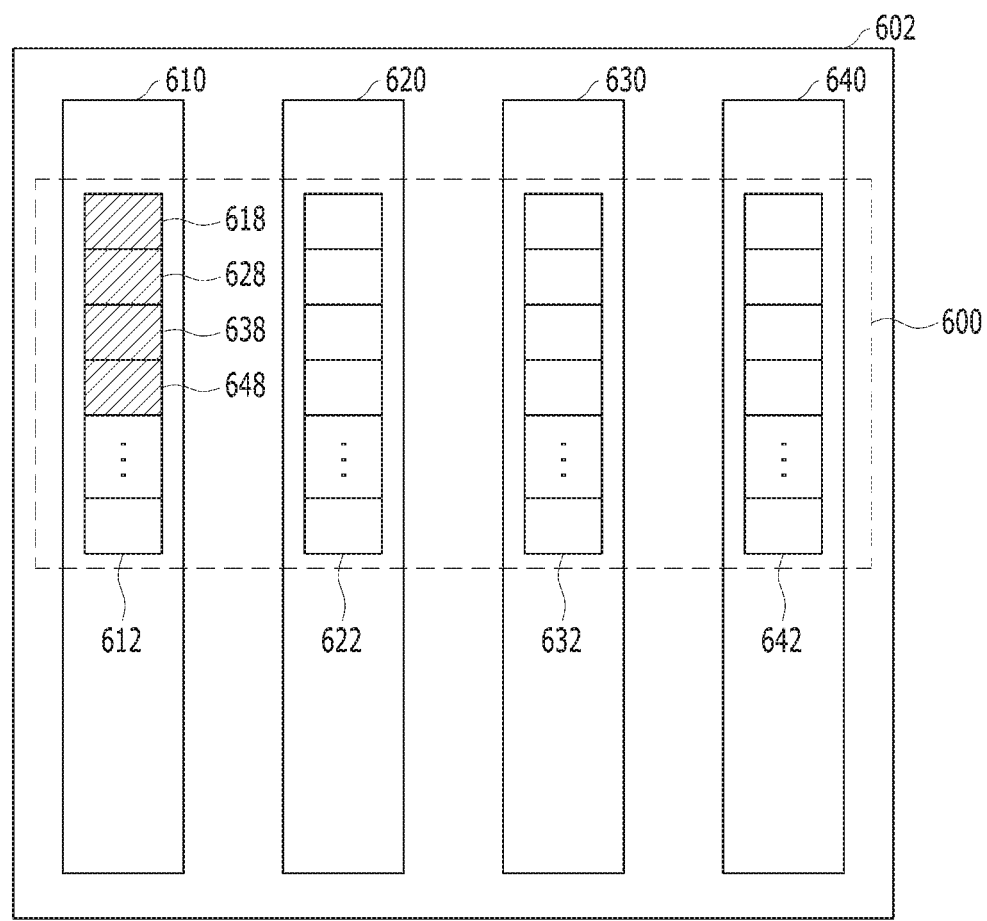

FIGS. 6A and 6B are diagrams schematically illustrating distribution of valid pages in a super memory block.

For example, a super memory block 600 may comprise first to fourth planes 610 to 640 including first to fourth memory blocks 612 to 642, respectively. All of the first to fourth planes 610 to 640 may be included in the same die 602. It is assumed that the total number of valid pages included in the first to fourth memory blocks 612 to 642 of the super memory block 600 is 4.

FIG. 6A shows a case in which the valid pages are concentrated at a particular index within the super memory block 600. Valid pages, among all pages 614 to 644, are identified with cross-hatching.

Among the pages within the super memory block 600, valid pages of the same index may be included in different ones of the first to fourth planes 610 to 640 and may be disposed at the same row. For example, among the pages within the first to fourth memory blocks 612 to 642, the valid pages of the indexes 1 to 4 may be respectively disposed at first to fourth rows.

FIG. 6A exemplifies that all pages 614 to 644 of the first index are valid pages and remaining pages of the second to fourth indexes are invalid pages. As described above with reference to FIG. 5, the processor 134 may control the memory device 150 to perform a single read operation of simultaneously reading data programmed in pages of the same index among pages within different memory blocks of the super memory block 600. Therefore, the processor 134 may control the memory device 150 to perform a single read operation of simultaneously reading valid data programmed in the pages 614 to 644 of the first index thereby reading all valid data programmed in the super memory block 600.

FIG. 6B shows a case in which the valid pages are distributed over several indexes within the super memory block 600.

FIG. 6B shows that all valid pages are included in the first memory block 612 while the second to fourth memory blocks 622 to 642 include invalid pages. As shown, the valid pages have first to fourth indexes respectively and thus the processor 134 controls the memory device 150 to perform a read operation four times to read all valid data programmed in the super memory block 600.

As exemplified in FIGS. 6A and 6B, the number of read operations for reading all the valid pages within the super memory block 600 may depend on the distribution of the valid pages or a number of indexes of the valid pages under the condition of the same number of valid pages within the super memory block 600. The operation time of reading all the valid pages within the super memory block 600 may be shortened as the valid pages are distributed among a smaller number of indexes within the super memory block 600 and may be lengthened as the valid pages are distributed among a greater number of indexes within the super memory block 600. Since the operation time of the read operation for all the valid pages within the super memory block 600 is proportional to the operation time of the garbage collection operation on the super memory block 600, the distribution of the valid pages within the super memory block 600 may affect the operation time of the garbage collection operation on the super memory block 600.

Referring back to FIG. 5, at step S504, the processor 134 may generate sequence or concentration information (SOMD) representing map information of the valid pages included in the victim memory block. As described above with reference to FIG. 4, the map information may include logical-to-physical (L2P) information and physical-to-logical (P2L) information. The logical-to-physical (L2P) information may be mapping information of the most recent physical address corresponding to the logical address. The physical-to-logical (P2L) information may be mapping information of the logical address corresponding to the physical address. Based on the physical-to-logical (P2L) information, the processor 134 may divide the logical addresses of pages by units of map segments and may count a number of map segments having the logical addresses of the valid pages included in the victim memory block. The processor 134 may count as the concentration information (SOMD), which may be indicative of the concentration of map information, the number of map segments having the logical addresses of the valid pages included in the victim memory block. The concentration information (SOMD) may represent a degree of concentration of the logical addresses of the valid pages within the victim memory block.

In accordance with an embodiment of the present disclosure, the processor 134 may dynamically change the operation time of the garbage collection operation of the super memory block 600 according to the concentration information (SOMD) of map information. As the logical addresses of the valid pages within the victim memory block are more concentrated, time to perform the map update operation may be shortened. As the logical addresses of the valid pages within the victim memory block are more random, a longer time may be needed to perform the map update operation. For example, a number of map segments having logical addresses of the valid pages may be greater when the logical addresses of the valid pages are randomly distributed than when the logical addresses of the valid pages are concentrated. It may take more time for the processor 134 to perform the map update operation by units of the map segments when the number of map segments having logical addresses of the valid pages is high or when the logical addresses of the valid pages are randomly distributed. Since the operation time of the map update operation for the super memory block 600 is proportional to the operation time of the garbage collection operation on the super memory block 600, the degree of concentration of the logical addresses of the valid pages within the super memory block 600 may affect the operation time of the garbage collection operation on the super memory block 600.

At step S506, the processor 134 may count a number (VPC) of valid pages within the victim memory block. As the number (VPC) of valid pages within the victim memory block becomes greater, a size of valid data as a target of the valid data read operation may become greater and thus it may take more time to perform the valid data read operation of reading the valid data and to perform the valid data program operation of programming the read valid data into an empty page within a target memory block. Since the number (VPC) of valid pages within the victim memory block is proportional to the operation times of the valid data read operation and the valid data program operation, the number (VPC) of valid pages within the victim memory block may affect the operation time of the garbage collection operation.

At step S508, the processor 134 may determine the operation time (GCPT) of the garbage collection operation based on the valid page distribution information (VPDI), the concentration information (SOMD) of map information and the number (VPC) of valid pages within the victim memory block that are obtained at steps S502 to S506. In accordance with an embodiment of the present disclosure, the processor 134 may lengthen the operation time (GCPT) of the garbage collection operation when the number of valid pages is high, when the valid pages are distributed among more indexes and/or when the map information is more randomly distributed.

At step S510, the processor 134 may control the memory device 150 to perform the garbage collection operation within the operation time (GCPT) of the garbage collection operation, which is determined at step S508. In accordance with an embodiment of the present disclosure, the operation time (GCPT) of the garbage collection operation may be dynamically changed according to the valid page distribution information (VPDI), the concentration information (SOMD) of map information and the number (VPC) of valid pages within the victim memory block thereby preventing the problem of the prior art that the flash memory device cannot complete the garbage collection operation for all victim memory blocks thereof within the fixed time and thus cannot secure sufficient memory space when there are a great number of valid pages or the logical addresses of the valid pages are too random.

Figures 7, 8:
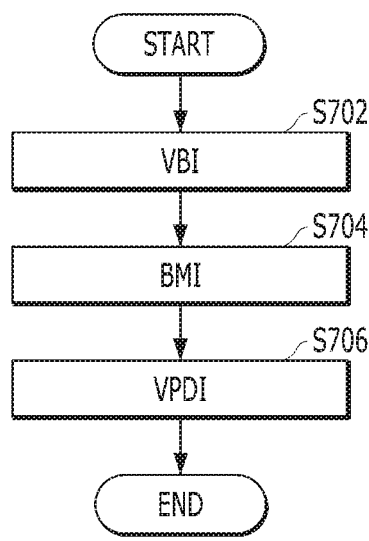
FIG. 7 is a flowchart schematically illustrating an operation of generating valid page distribution information (VPDI).
FIG. 8 is a diagram schematically illustrating a bitmap in accordance with an embodiment of the present disclosure.

FIG. 7 is a flowchart schematically illustrating the step S502 of generating valid page distribution information (VPDI).

The step S502 described with reference to FIG. 5 may include step S702 of detecting victim memory block information (VBI), step S704 of generating bitmap information (BMI) and step S706 of generating the valid page distribution information (VPDI).

At step S702, the processor 134 may generate the victim memory block information (VBI). In accordance with an embodiment of the present disclosure, the processor 134 may detect as victim memory blocks super memory blocks each having valid pages, a number of which is less than a threshold, and generate as the victim memory block information (VBI) information of addresses of the super memory blocks detected as the victim memory blocks.

At step S704, the processor 134 may generate the bitmap information (BMI) for the super memory blocks detected as victim memory blocks according to the victim memory block information (VBI) generated at step S702. The processor 134 may generate a bitmap having the same number of columns as planes in a single super memory block and having the same number of rows as pages in memory blocks of a single plane. Pages having the same index may be included in different planes in a super memory block and may be disposed at the same row. The processor 134 may generate the bitmap information (BMI) by distinguishing between valid pages and invalid pages among the pages within a super memory block detected as the victim memory block and setting the valid pages and the invalid pages respectively to have values of '1' and '0' as entries of the bitmap.

At step S706, the processor 134 may generate the valid page distribution information (VPDI) by counting a number of indexes having one or more entries of the value '1' within the bitmap generated at step S704.

FIG. 8 is a diagram schematically illustrating the bitmap 802 in accordance with an embodiment of the present disclosure.

In accordance with an embodiment of the present disclosure, the bitmap 802 may correspond to a single super memory block. It is exemplified that the single super memory block includes four planes of the same die and each plane includes a single memory block. It is also exemplified that each of the four memory blocks has four pages.

The processor 134 may record, respectively in first to fourth columns of the bitmap 802, bit information for the memory blocks configuring the single super memory block. The processor 134 may record, respectively in first to fourth rows of the bitmap 802, bit information for the pages of corresponding index of the respective memory blocks of the first to fourth planes configuring the single super memory block. As described above, the pages having the same index may be included in different planes included in a super memory block and may be disposed at the same row.

The processor 134 may set the entry corresponding to a valid page to have a value of '1' and may set the entry corresponding to an invalid page to have a value of '0'. The processor 134 may determine the validity of a page included in a super memory block according to the logical-to-physical (L2P) information and the physical-to-logical (P2L) information described with reference to FIG. 4. The processor 134 may identify, from the physical-to-logical (P2L) information, a logical address for data programmed in the pages and may identify, from the logical-to-physical (L2P) information, the most recent physical address corresponding to the identified logical address. The processor 134 may determine a page as a valid page when the logical address of the page corresponds to the most recent physical address identified from the logical-to-physical (L2P) information and may determine the page as an invalid page when the logical address of the page does not correspond to the most recent physical address identified from the logical-to-physical (L2P) information. The processor 134 may set the value of '1' or '0' within the bitmap 802 according to the result of determining corresponding pages as valid and invalid pages.

After setting the values of the entries of the bitmap 802, the processor 134 may count a number of indexes having one or more entries of the value '1' among the indexes configuring the bitmap 802. As exemplified in FIG. 8, the first index may have four entries of the value '1', the second index may have one entry of the value '1' and the third index may have two entries of the value '1'. Therefore, the processor 134 may determine that the single super memory block corresponding to the bitmap 802 has three indexes, each having one or more valid pages. In the same way, the processor 134 may count a number of indexes having one or more entries of the value '1' among the indexes configuring the bitmaps corresponding to other victim memory blocks.

Based on the numbers of indexes having one or more entries of the value '1' in the respective victim memory blocks, the processor 134 may generate the valid page distribution information (VPDI).

Figure 9:
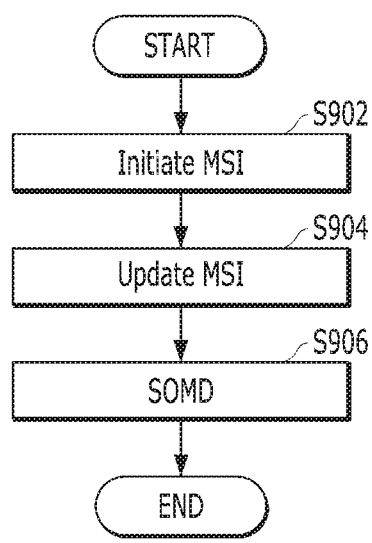
FIG. 9 is a flowchart schematically illustrating an operation of generating sequence or concentration information (SOMD) representing map information.

FIG. 9 is a flowchart schematically illustrating the step S504 of generating concentration information (SOMD) representing map information.

The step S504 described with reference to FIG. 5 may include step S902 of initializing map segment information (MSI), step S904 of updating the map segment information (MSI) and step S906 of generating the concentration information (SOMD) of map information.

At step S902, the processor 134 may perform an initialization operation by generating the map segment information (MSI). The processor 134 may generate a map segment by dividing the logical addresses by a set number. For example, when generating the map segment by dividing the logical addresses by 16, the processor 134 may group zeroth to fifteenth logical addresses into a first map segment and may group sixteenth to thirty-first logical addresses into a second map segment. The processor 134 may initialize all bit information corresponding to the map segments to have a value of '0' within the map segment information (MSI).

At step S904, the processor 134 may update the map segment information (MSI), which is initialized at step S902, according to the bitmap information (BMI), which is generated at step S704 described with reference to FIG. 7. The processor 134 may update bit information, which corresponds to the map segment having the logical address corresponding to the entry having a value of '1' among entries of the bitmap 802, to have a value of '1' within the map segment information (MSI). For example, when a logical address of valid page included in the victim memory block is '20' and the map segment is generated by units of 16 logical addresses, the processor 134 may update the map segment information (MSI) such that the bit information corresponding to the second map segment to have a value of '1' within the map segment information (MSI).

At step S906, the processor 134 may generate the concentration information (SOMD) of map information by counting a number of map segments corresponding to the bit information having a value of '1', within the map segment information (MSI) updated at step S904. In accordance with an embodiment of the present disclosure, the processor 134 may obtain the concentration information of the valid page by counting the number of map segments corresponding to the bit information having a value of '1' within the map segment information (MSI). Provided that a number of the valid pages included in a victim memory block is constant, a greater number of map segments corresponding to the bit information having a value of '1' within the map segment information (MSI) may represent more random distribution of the logical addresses of the valid pages.

In accordance with an embodiment of the present disclosure, the processor 134 may lengthen the operation time of the garbage collection operation in proportion to the number of map segments, the bit information corresponding to which have a value of '1', based on the concentration information (SOMD) of map information. As a number of map segments corresponding to the bit information having a value of '1' becomes greater, the logical addresses of the valid pages may be more randomly distributed and the more random distribution of the logical addresses of the valid pages may cause increased operation time for the map update operation. For example, when the processor 134 performs the map update operation by units of map segments, the operation time for the map update operation may increase as a number of map segments as targets of the map update operation increases.

FIG. 10 is a diagram schematically illustrating map segment information in accordance with an embodiment of the present disclosure.

FIG. 10 illustrates zeroth to seventy-first logical addresses as an example. It is exemplified that the map segment is generated by units of sixteen logical addresses and the victim memory block has four valid pages.

Referring to FIG. 10, the processor 134 may perform the update operation such that bit information corresponding to the first to fifth map segments included in the map segment information 1002 have values of '0'. The processor 134 may generate the first map segment 1012 by grouping the zeroth to fifteenth logical addresses LBA 0 to LBA 15 and may generate the second map segment 1014 by grouping the sixteenth to thirty-first logical addresses LBA 16 to LBA 31.

Referring to FIG. 10, "<Case 1>" shows the zeroth to third logical addresses LBA 0 to LBA 3 of the first to fourth valid pages, respectively. The processor 134 may perform the update operation on the map segment information 1004 by changing bit information 1022 of the first map segment including the zeroth to third logical addresses LBA 0 to LBA 3 of the first to fourth valid pages to have a value of '1'. The processor 134 may generate the concentration information (SOMD) of map information by counting the number of the map segments corresponding to the bit information having a value of '1' within the map segment information 1004.

Referring to FIG. 10, "<Case 2>" shows the zeroth, twentieth, thirty-fifth and fifty-fifth logical addresses LBA 0, LBA 20, LBA 35 and LBA 55 of the first to fourth valid pages, respectively. The processor 134 may perform the update operation on the map segment information 1006 by changing bit information 1032, 1034, 1036 and 1038 of the first to fourth map segments respectively including the zeroth, twentieth, thirty-fifth and fifty-fifth logical addresses LBA 0, LBA 20, LBA 35 and LBA 55 of the first to fourth valid pages to have a value of '1'. The processor 134 may generate the concentration information (SOMD) of map information by counting the number of the map segments corresponding to the bit information having a value of '1' within the map segment information 1006, which number is 4.

As exemplified in "<Case 1>" and "<Case 2>", a number of the map segments corresponding to bit information having a value of '1', becomes greater as the logical addresses of the valid pages are more randomly distributed. In accordance with an embodiment of the present disclosure, the processor 134 may generate the concentration information (SOMD) of map information, which represents a degree of concentration of the logical addresses of the valid pages, by counting the number of map segments corresponding to the bit information having a value of '1' within the map segment information.

Figure 11:
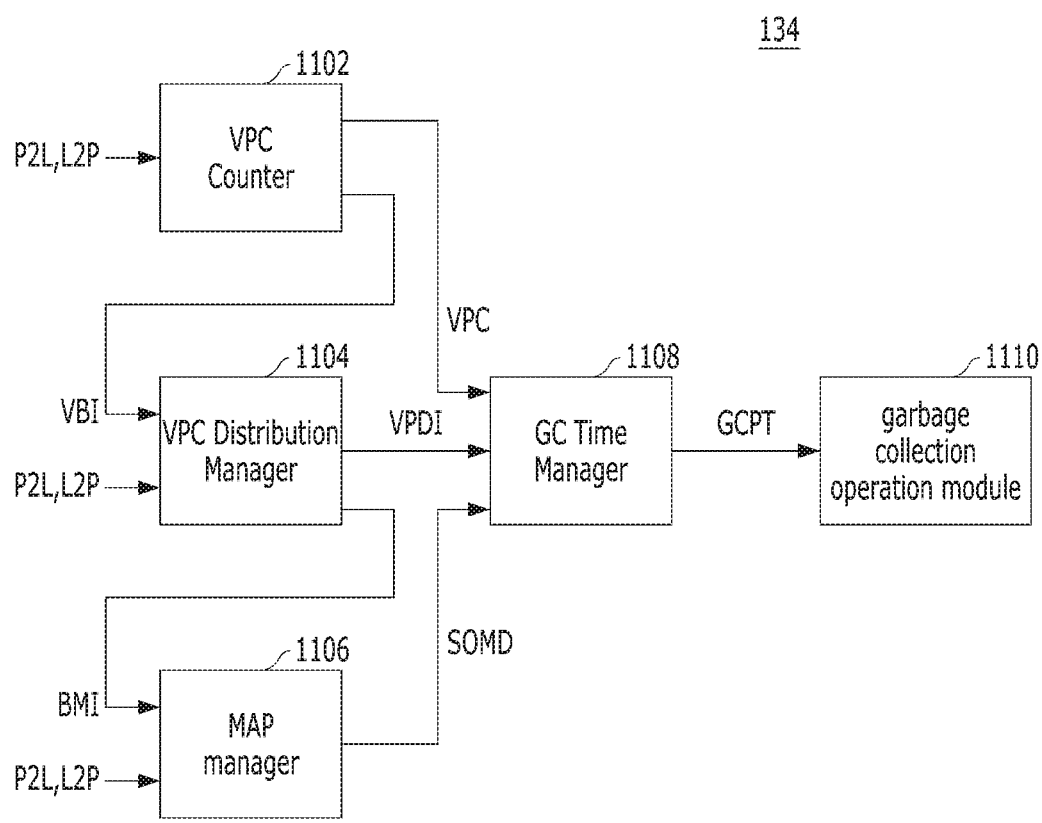
FIG. 11 is a block diagram schematically illustrating a processor in accordance with an embodiment of the present disclosure.

FIG. 11 is a block diagram schematically illustrating the processor 134 in accordance with an embodiment of the present disclosure. For clarity, FIG. 11 illustrates elements related to an embodiment of the present disclosure among all elements of the data processing system 100 described with reference to FIG. 2.

The processor 134 may include the valid page number counter 1102, the valid page distribution manager 1104, the map manager 1106, the garbage collection operation time manager 1108 and the garbage collection operation module 1110.

The valid page number counter 1102 may detect the victim memory block and may count a number of the valid pages (VPC) included in the victim memory block. In accordance with an embodiment of the present disclosure, the valid page number counter 1102 may detect as victim memory blocks super memory blocks each having a smaller number of valid pages than a threshold, which may be predetermined, and may generate address information of the super memory blocks, which is detected as the victim memory blocks, as the victim memory block information (VBI). The valid page number counter 1102 may determine the validity of a page included in a super memory block according to the logical-to-physical (L2P) information and the physical-to-logical (P2L) information. The valid page number counter 1102 may provide the garbage collection operation time manager 1108 with the number (VPC) of valid pages within each of the victim memory blocks and may provide the valid page distribution manager 1104 with the victim memory block information (VBI).

The valid page distribution manager 1104 may generate the bitmap for the super memory blocks detected as the victim memory blocks according to the victim memory block information (VBI). The valid page distribution manager 1104 may generate the bitmap as described with reference to FIG. 8.

The valid page distribution manager 1104 may generate the bitmap information (BMI) and the valid page distribution information (VPDI) as described with reference to FIGS. 7 and 8. The valid page distribution manager 1104 may provide the garbage collection operation time manager 1108 and the map manager 1106 with the valid page distribution information (VPDI) and the bitmap information (BMI), respectively.

The map manager 1106 may generate the sequence or concentration information (SOMD) of map information according to the bitmap information (BMI) and the logical-to-physical (L2P) information and the physical-to-logical (P2L) information stored in the memory 144 as described with reference to FIGS. 9 and 10. The map manager 1106 may provide the garbage collection operation time manager 1108 with the sequence or concentration information (SOMD) of map information.

The garbage collection operation time manager 1108 may dynamically change the operation time (GCPT) of the garbage collection operation according to the valid page distribution information (VPDI), the concentration information (SOMD) of map information and the number (VPC) of valid pages within the victim memory blocks. In accordance with an embodiment of the present disclosure, the garbage collection operation time manager 1108 may lengthen the operation time (GCPT) of the garbage collection operation when the number of valid pages is great, when the valid pages are distributed to have great number of indexes and/or when the map information is more randomly distributed. In accordance with an embodiment of the present disclosure, the garbage collection operation time manager 1108 may shorten the operation time (GCPT) of the garbage collection operation when the number of valid pages is small, when the valid pages are distributed to have a smaller number of indexes and/or when the map information is concentratedly distributed.

For example, the garbage collection operation time manager 1108 may lengthen the operation time (GCPT) of the garbage collection operation in proportion to the number of map segments corresponding to the bit information having a value of '1' within the concentration information (SOMD), which is indicative of concentration of map information. As the number of map segments corresponding to the bit information having a value of '1' becomes greater, the distribution of the logical addresses of the valid pages may become more random. As the distribution of the logical addresses of the valid pages become more random, the operation time of the map update operation for the super memory block may become lengthened. For example, when the processor 134 performs the map update operation by units of the map segments, the operation time of the map update operation for the super memory block may become lengthened as a number of the map segments as the target of the map update operation becomes greater. The garbage collection operation time manager 1108 may provide the garbage collection operation module 1110 with the information of the operation time (GCPT) of the garbage collection operation.

The garbage collection operation module 1110 may control the memory device 150 to perform the garbage collection operation within the operation time (GCPT) of the garbage collection operation according to the provided information of the operation time (GCPT). In accordance with an embodiment of the present disclosure, the operation time (GCPT) of the garbage collection operation may be dynamically changed according to the valid page distribution information (VPDI), the concentration information (SOMD) of map information and the number (VPC) of valid pages within the victim memory block, thereby preventing the problem of the prior art that the flash memory device cannot complete the garbage collection operation for all victim memory blocks thereof within the fixed time and thus cannot secure sufficient memory space when there are a great number of valid pages or the logical addresses of the valid pages are too random.

Figure 12:
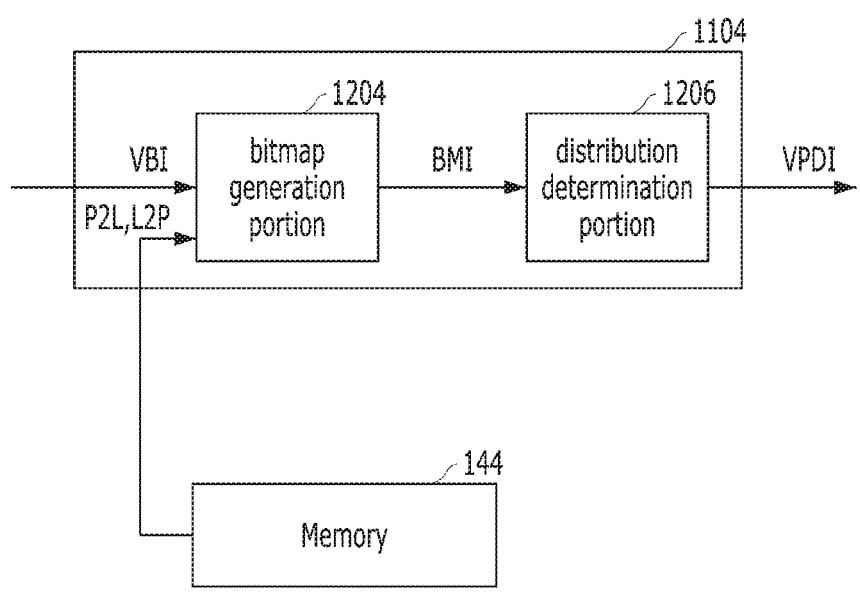
FIG. 12 is a block diagram schematically illustrating a valid page distribution manager in accordance with an embodiment of the present disclosure.

FIG. 12 is a block diagram schematically illustrating the valid page distribution manager 1104.

The valid page distribution manager 1104 may include a bitmap generation portion 1204 and a distribution determination portion 1206.

The bitmap generation portion 1204 may generate the bitmap for the super memory blocks detected as the victim memory blocks according to the victim memory block information (VBI) and the logical-to-physical (L2P) information and the physical-to-logical (P2L) information stored in the memory 144. The bitmap generation portion 1204 may generate the bitmap having the same number of columns as planes in a single super memory block and having the same number of rows as pages in memory blocks of a single plane.

The bitmap generation portion 1204 may identify, from the physical-to-logical (P2L) information, a logical address for data programmed in the pages respectively corresponding to the entries of the bitmap and may identify, from the logical-to-physical (L2P) information, the most recent physical address corresponding to the identified logical address. The bitmap generation portion 1204 may determine a page corresponding to an entity of the bitmap as a valid page when the logical address of the page corresponding to the entity of the bitmap corresponds to the most recent physical address identified from the logical-to-physical (L2P) information and may determine the page as an invalid page when the logical address of the page corresponding to the entity of the bitmap does not correspond to the most recent physical address identified from the logical-to-physical (L2P) information.

The bitmap generation portion 1204 may generate the bitmap information (BMI) by setting the valid pages and the invalid pages respectively to have values of '1' and '0' as entries of the bitmaps respectively corresponding to the super memory blocks. The bitmap generation portion 1204 may provide the distribution determination portion 1206 with the bitmap information (BMI).

The distribution determination portion 1206 may generate the valid page distribution information (VPDI) according to the bitmap information (BMI). The distribution determination portion 1206 may generate the valid page distribution information (VPDI) by counting a number of indexes having one or more entries of the value '1' among the indexes configuring the bitmap.

Figure 13:
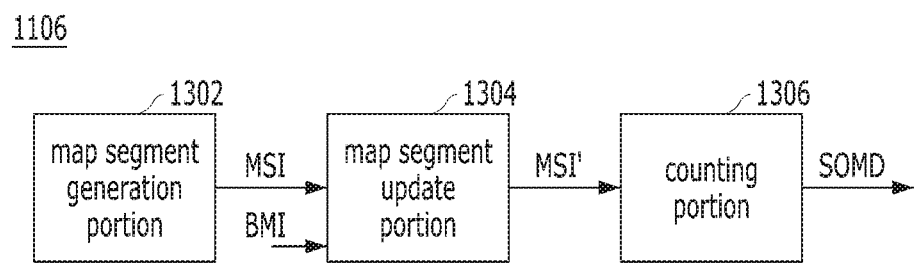
FIG. 13 is a block diagram schematically illustrating a map manager in accordance with an embodiment of the present disclosure.

FIG. 13 is a block diagram schematically illustrating the map manager 1106.

The map manager 1106 may include a map segment generation portion 1302, a map segment update portion 1304 and a counting portion 1306.

The map segment generation portion 1302 may generate a map segment by dividing the logical addresses of pages by a fixed unit, as described with reference to step S902 of FIGS. 9 and 10.

The map segment update portion 1304 may update the map segment information (MSI), as described with reference to step S904 of FIGS. 9 and 10.

The counting portion 1306 may generate the concentration information (SOMD) of map information, as described with reference to step S906 of FIGS. 9 and 10.

A memory device 150 of the memory system 110 is described below with reference to FIGS. 14 to 16 in accordance with an embodiment of the present disclosure.

Figure 14:
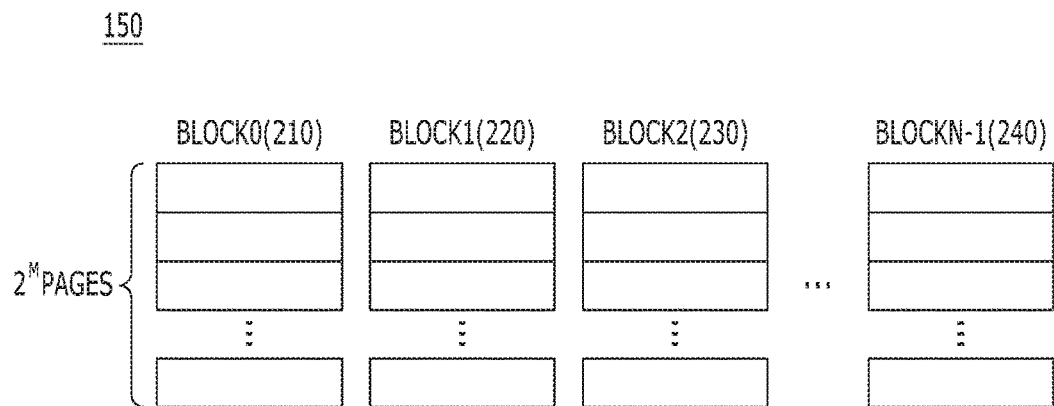
FIG. 14 is a schematic diagram illustrating an exemplary configuration of a memory device employed in the memory system shown in FIG. 2.

FIG. 14 is a schematic diagram illustrating the memory device 150. FIG. 15 is a circuit diagram illustrating an exemplary configuration of a memory cell array of a memory block 330 in the memory device 150. FIG. 16 is a schematic diagram illustrating an exemplary 3D structure of the memory device 150.

Referring to FIG. 14, the memory device 150 may include a plurality of memory blocks BLOCK0 to BLOCKN-1, where N is an integer greater than 1. Each of the blocks BLOCK0 to BLOCKN-1 may include a plurality of pages, for example, $2^M$ or M pages, the number of which may vary according to circuit design, M being an integer greater than 1. Each of the pages may include a plurality of memory cells that are coupled to a plurality of word lines WL.

Also, memory cells in the respective memory blocks BLOCK0 to BLOCKN-1 may be any of a single level cell (SLC) storing 1-bit data or a multi-level cell (MLC) storing 2- or more bit data. Hence, the memory device 150 may include SLC memory blocks or MLC memory blocks, depending on the number of bits which can be expressed or stored in each of the memory cells in the memory blocks. The SLC memory blocks may include a plurality of pages which are embodied by memory cells, each storing one-bit data. The SLC memory blocks may generally have higher data computing performance and higher durability than the MCL memory blocks. The MLC memory blocks may include a plurality of pages which are embodied by memory cells each storing multi-bit data (for example, 2 or more bits). The MLC memory blocks may generally have larger data storage space, that is, higher integration density, than the SLC memory blocks. In other embodiments, the memory device 150 may include higher multi-level cell blocks, such as a plurality of triple level cell (TLC) memory blocks or a plurality of quadruple level cell (QLC) memory blocks. The TCL memory blocks may include a plurality of pages which are embodied by memory cells each capable of storing 3-bit data. The QLC memory blocks may include a plurality of pages which are embodied by memory cells each capable of storing 4-bit data.

Instead of a nonvolatile memory, the memory device 150 may be implemented by any one of a phase change random access memory (PCRAM), a resistive random access memory (RRAM(ReRAM)), a ferroelectrics random access memory (FRAM), and a spin transfer torque magnetic random access memory (STT-RAM(STT-MRAM)).

The memory blocks 210, 220, 230, 240 may store the data transferred from the host 102 through a program operation, and may transfer data stored therein to the host 102 through a read operation.

Figure 15:
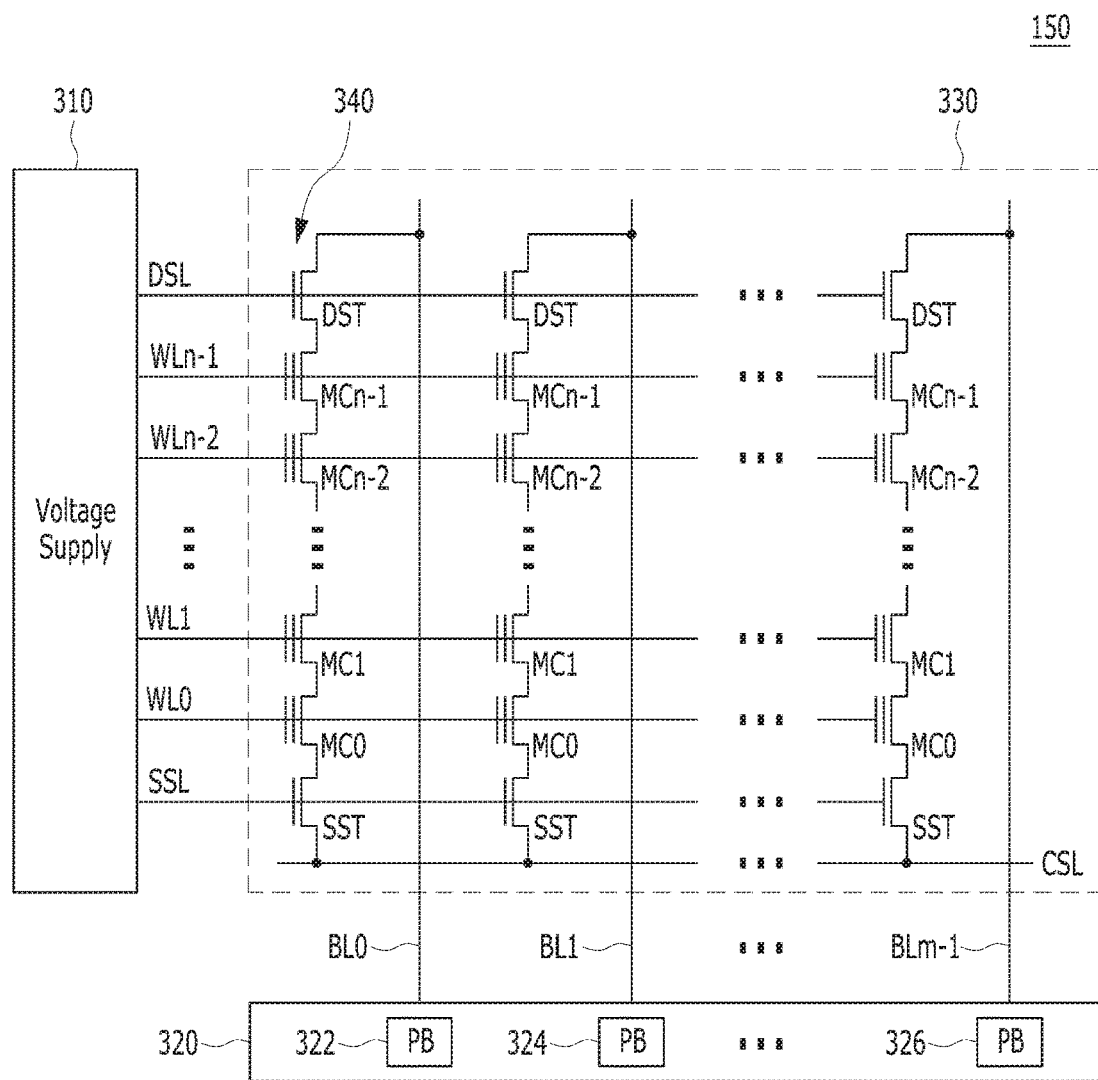
FIG. 15 is a circuit diagram illustrating an exemplary configuration of a memory cell array of a memory block in the memory device shown in FIG. 2.
Figure 16:
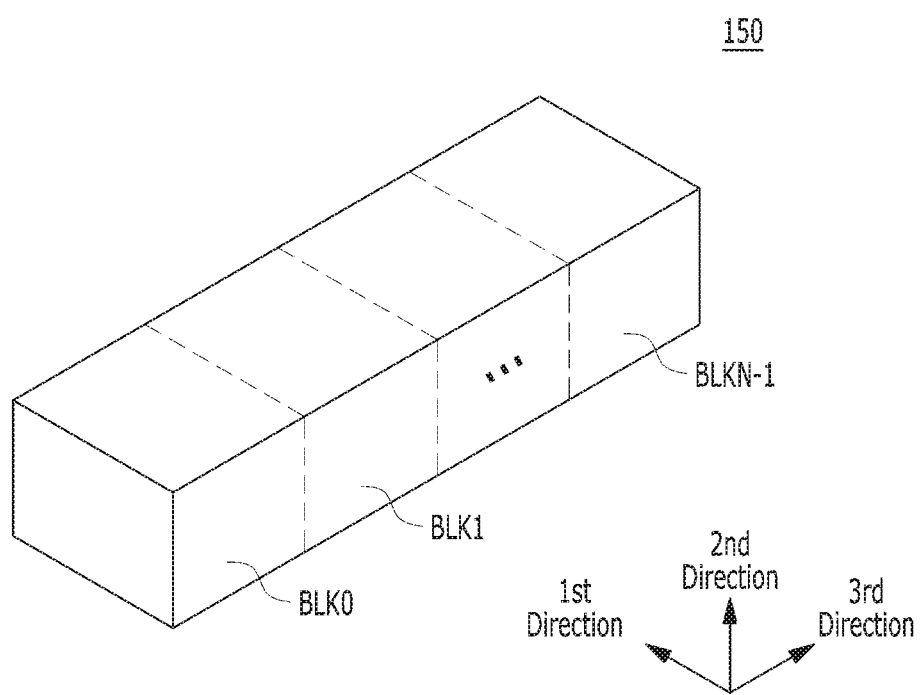
FIG. 16 is a block diagram illustrating a structure of a memory device of a memory system in accordance with an embodiment of the present invention.

Referring to FIG. 15, the memory block 330 may include a plurality of cell strings 340 coupled to a plurality of corresponding bit lines BL0 to BLm-1. The cell string 340 of each column may include one or more drain select transistors DST and one or more source select transistors SST. Between the drain and source select transistors DST and SST, a plurality of memory cells MC0 to MCn-1 may be coupled in series. In an embodiment, each of the memory cell transistors MC0 to MCn-1 may be embodied by an MLC capable of storing data information of a plurality of bits. Each of the cell strings 340 may be electrically coupled to a corresponding bit line among the plurality of bit lines BL0 to BL-1. For example, as illustrated in FIG. 15, the first cell string is coupled to the first bit line BL0, and the last cell string is coupled to the last bit line BLm-1.

Although FIG. 15 illustrates NAND flash memory cells, the present disclosure is not limited thereto. It is noted that the memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply 310 which generates different word line voltages including a program voltage, a read voltage, and a pass voltage to supply to the word lines according to an operation mode. The voltage generation operation of the voltage supply 310 may be controlled by a control circuit (not illustrated). Under the control of the control circuit, the voltage supply 310 may select at least one of the memory blocks (or sectors) of the memory cell array, select at least one of the word lines of the selected memory block, and provide the word line voltages to the selected word line(s) and the unselected word lines as may be needed.

The memory device 150 may include a read/write circuit 320 which is controlled by the control circuit. During a verification/normal read operation, the read/write circuit 320 may operate as a sense amplifier for reading (sensing and amplifying) data from the memory cell array. During a program operation, the read/write circuit 320 may operate as a write driver for supplying a voltage or a current to bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs). Each of the page buffers 322 to 326 may include a plurality of latches (not illustrated).

The memory device 150 may be embodied by a 2D or 3D memory device. Particularly, as illustrated in FIG. 16, the memory device 150 may be embodied by a nonvolatile memory device having a 3D stack structure. When the memory device 150 has a 3D structure, the memory device 150 may include a plurality of memory blocks BLK0 to BLKN-1, which may correspond to the memory blocks 152, 154 and 156 of the memory device 150 shown in FIG. 2. Each of the memory blocks 152, 154 and 156 may be realized in a 3D structure (or vertical structure). For example, each of the memory blocks 152, 154 and 156, as well as the collective structure, may be three-dimensional with dimensions extending in mutually orthogonal directions, e.g., an x-axis direction, a y-axis direction, and a z-axis direction, as shown in FIG. 16.

Each memory block 330 included in the memory device 150 may include a plurality of NAND strings NS that are extended in the second direction, and a plurality of NAND strings NS that are extended in the first direction and the third direction. Herein, each of the NAND strings NS may be coupled to a bit line BL, at least one string selection line SSL, at least one ground selection line GSL, a plurality of word lines WL, at least one dummy word line DWL, and a common source line CSL, and each of the NAND strings NS may include a plurality of transistor structures TS.

In short, each memory block 330, which is representative of any of the memory blocks 152, 154 and 156 of the memory device 150, may be coupled to a plurality of bit lines BL, a plurality of string selection lines SSL, a plurality of ground selection lines GSL, a plurality of word lines WL, a plurality of dummy word lines DWL, and a plurality of common source lines CSL, and each memory block 330 may include a plurality of NAND strings NS. Also, in each memory block 330, one bit line BL may be coupled to a plurality of NAND strings NS to realize a plurality of transistors in one NAND string NS. Also, a string selection transistor SST of each NAND string NS may be coupled to a corresponding bit line BL, and a ground selection transistor GST of each NAND string NS may be coupled to a common source line CSL. Herein, memory cells MC may be provided between the string selection transistor SST and the ground selection transistor GST of each NAND string NS. In other words, a plurality of memory cells may be realized in each memory block 330 of the memory device 150.

Hereinafter, a data processing system and electronic apparatuses, in which the memory system 110 including the controller 130 and the memory device 150 described above is implemented, are described with reference to FIGS. 17 to 25, in accordance with embodiments of the present disclosure.

Figure 17:
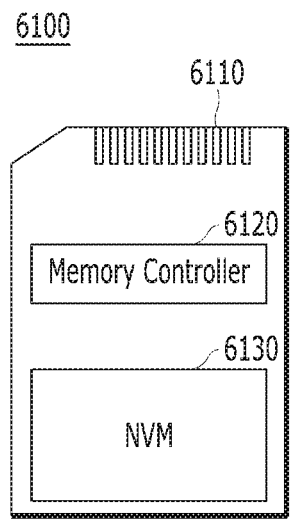
FIGS. 17 to 25 are diagrams schematically illustrating exemplary applications of the data processing system in accordance with various embodiments of the present invention.

FIG. 17 is a diagram schematically illustrating another example of the data processing system including the memory system in accordance with an embodiment. FIG. 17 schematically illustrates a memory card system to which the memory system may be applied.

Referring to FIG. 17, the memory card system 6100 may include a memory controller 6120, a memory device 6130 and a connector 6110.

More specifically, the memory controller 6120 may be electrically connected to, and configured to access, the memory device 6130 embodied by a nonvolatile memory. For example, the memory controller 6120 may be configured to control read, write, erase and background operations of the memory device 6130. The memory controller 6120 may be configured to provide an interface between the memory device 6130 and a host, and to use firmware for controlling the memory device 6130. That is, the memory controller 6120 may correspond to the controller 130 of the memory system 110 described with reference to FIG. 2, and the memory device 6130 may correspond to the memory device 150 of the memory system 110 described with reference to FIG. 2.

Thus, the memory controller 6120 may include a RAM, a processor, a host interface, a memory interface and an error correction component.

The memory controller 6120 may communicate with an external device, for example, the host 102 of FIG. 2 through the connector 6110. For example, as described with reference to FIG. 2, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system may be applied to wired/wireless electronic devices, specifically mobile electronic devices.

The memory device 6130 may be implemented by a nonvolatile memory. For example, the memory device 6130 may be implemented by any of various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM).

The memory controller 6120 and the memory device 6130 may be integrated into a single semiconductor device to form a solid-state driver (SSD). Also, the memory controller 6120 and the memory device 6130 may be so integrated to form a memory card such as a PC card (PCMCIA: Personal Computer Memory Card International Association), a compact flash (CF) card, a smart media card (e.g., a SM and a SMC), a memory stick, a multimedia card (e.g., a MMC, a RS-MMC, a MMCmicro and an eMMC), an SD card (e.g., a SD, a miniSD, a microSD and a SDHC), and/or a universal flash storage (UFS).

Figure 18:
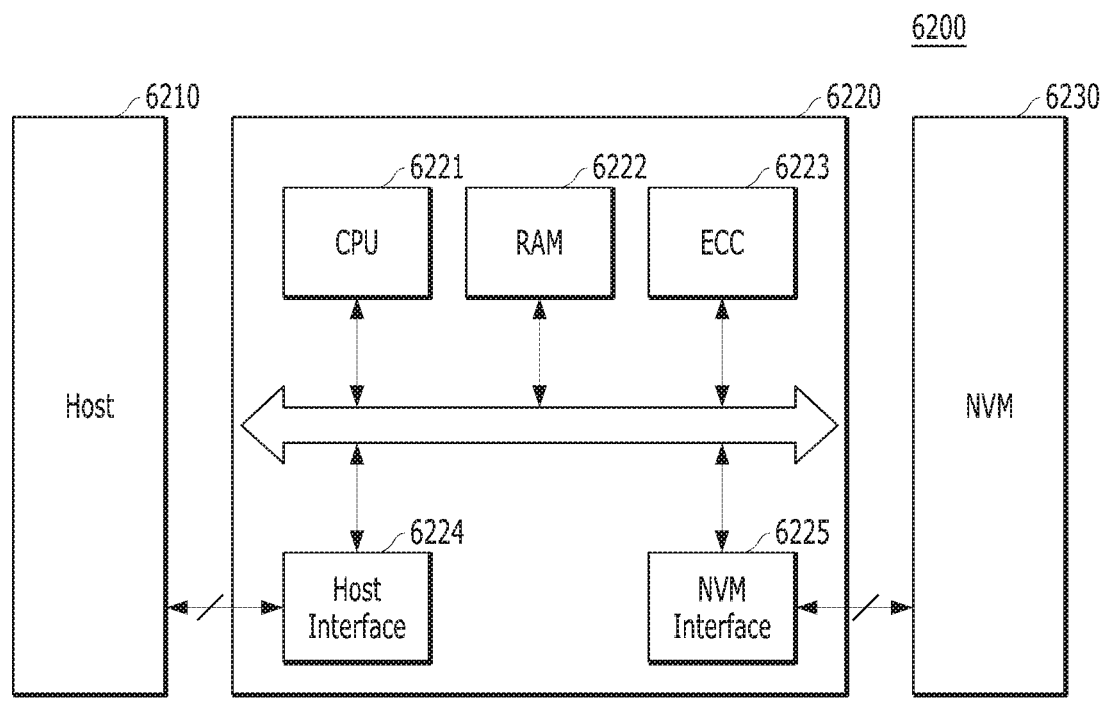

FIG. 18 is a diagram schematically illustrating another example of the data processing system including the memory system in accordance with an embodiment.

Referring to FIG. 18, the data processing system 6200 may include a memory device 6230 having one or more nonvolatile memories and a memory controller 6220 for controlling the memory device 6230. The data processing system 6200 illustrated in FIG. 18 may serve as a storage medium such as a memory card (CF, SD, micro-SD or the like) or USB device, as described with reference to FIGS. 2. The memory device 6230 may correspond to the memory device 150 in the memory system 110 illustrated in FIGS. 2, and the memory controller 6220 may correspond to the controller 130 in the memory system 110 illustrated in FIG. 2.

The memory controller 6220 may control a read, write or erase operation on the memory device 6230 in response to a request of the host 6210. The memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or vice versa. When the RAM 6222 is used as a cache memory, the RAM 6222 may assist the memory device 6230 to operate at high speed.

The ECC circuit 6223 may generate an ECC (Error Correction Code) for correcting a failed bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. The ECC circuit 6223 may correct an error using the parity bit. For example, the ECC circuit 6223 may correct an error using the LDPC code, BCH code, turbo code, Reed-Solomon code, convolution code, RSC or coded modulation such as TCM or BCM.

The memory controller 6220 may exchange data with the host 6210 through the host interface 6224. The memory controller 6220 may exchange data with the memory device 6230 through the NVM interface 6225. The host interface 6224 may be connected to the host 6210 through a PATA bus, a SATA bus, a SCSI, an USB, a PCIe or a NAND interface. The memory controller 6220 may have a wireless communication function with a mobile communication protocol such as WiFi or Long Term Evolution (LTE). The memory controller 6220 may be connected to an external device, for example, the host 6210 or another external device, and then exchange data with the external device. In particular, as the memory controller 6220 is configured to communicate with the external device according to one or more of various communication protocols, the memory system and the data processing system may be applied to wired/wireless electronic devices, particularly a mobile electronic device.

Figure 19:
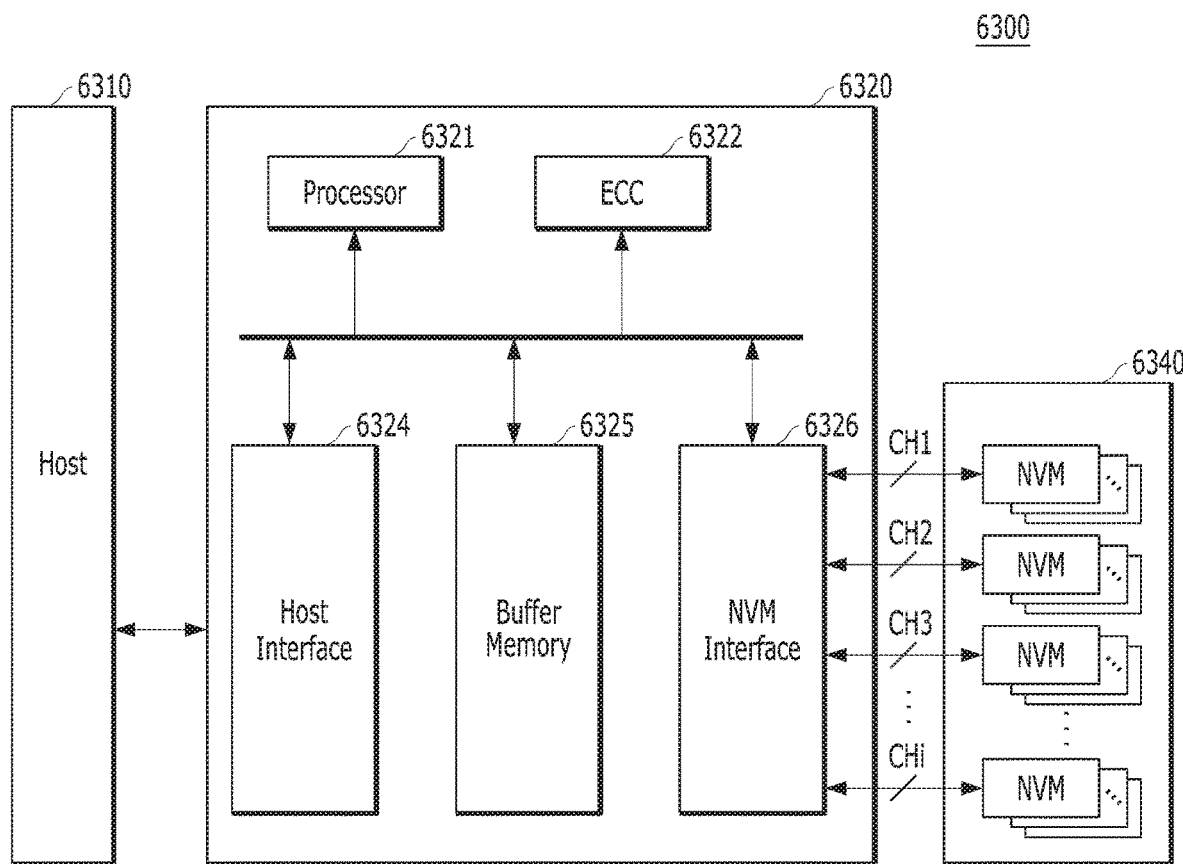

FIG. 19 is a diagram schematically illustrating another example of the data processing system including the memory system in accordance with an embodiment. FIG. 19 schematically illustrates an SSD to which the memory system may be applied.

Referring to FIG. 19, the SSD 6300 may include a controller 6320 and a memory device 6340 including a plurality of nonvolatile memories. The controller 6320 may correspond to the controller 130 in the memory system 110 of FIGS. 2, and the memory device 6340 may correspond to the memory device 150 in the memory system of FIGS. 2.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340. Further, the buffer memory 6325 may temporarily store meta data of the plurality of flash memories NVM, for example, map data including a mapping table. The buffer memory 6325 may be embodied by any of a variety of volatile memories such as a DRAM, a SDRAM, a DDR SDRAM, a LPDDR SDRAM and a GRAM or nonvolatile memories such as a FRAM, a ReRAM, a STT-MRAM and a PRAM. FIG. 19 illustrates that the buffer memory 6325 is embodied in the controller 6320. However, in another embodiment, the buffer memory 6325 may be external to the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIGS. 2 may be provided to embody a data processing system, for example, a RAID (Redundant Array of Independent Disks) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 20:
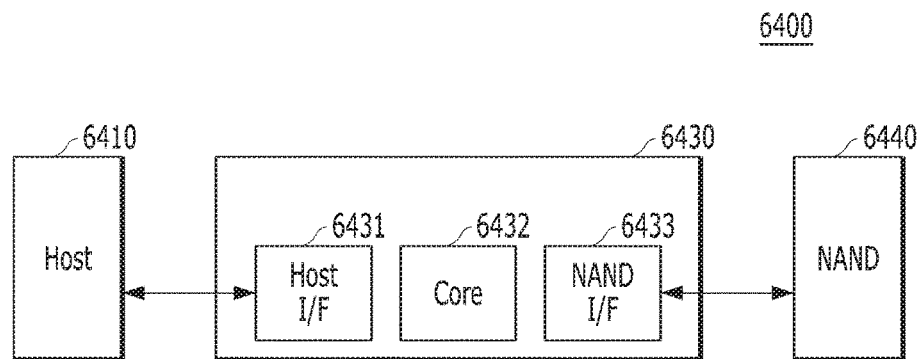

FIG. 20 is a diagram schematically illustrating another example of the data processing system including the memory system in accordance with an embodiment. FIG. 20 schematically illustrates an embedded Multi-Media Card (eMMC) to which the memory system may be applied.

Referring to FIG. 20, the eMMC 6400 may include a controller 6430 and a memory device 6440 embodied by one or more NAND flash memories. The controller 6430 may correspond to the controller 130 in the memory system 110 of FIG. 2. The memory device 6440 may correspond to the memory device 150 in the memory system 110 of FIG. 2.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 2. Furthermore, the host interface 6431 may serve as a serial interface, for example, UHS ((Ultra High Speed)-I/UHS-II) interface.

FIGS. 21 to 24 are diagrams schematically illustrating other examples of the data processing system including the memory system in accordance with embodiments. FIGS. 21 to 24 schematically illustrate UFS (Universal Flash Storage) systems to which the memory system may be applied.

Referring to FIGS. 21 to 24, the UFS systems 6500, 6600, 6700, 6800 may include hosts 6510, 6610, 6710, 6810, UFS devices 6520, 6620, 6720, 6820 and UFS cards 6530, 6630, 6730, 6830, respectively. The hosts 6510, 6610, 6710, 6810 may serve as application processors of wired/wireless electronic devices or particularly mobile electronic devices, the UFS devices 6520, 6620, 6720, 6820 may serve as embedded UFS devices, and the UFS cards 6530, 6630, 6730, 6830 may serve as external embedded UFS devices or removable UFS cards.

The hosts 6510, 6610, 6710, 6810, the UFS devices 6520, 6620, 6720, 6820 and the UFS cards 6530, 6630, 6730, 6830 in the respective UFS systems 6500, 6600, 6700, 6800 may communicate with external devices, for example, wired/wireless electronic devices or particularly mobile electronic devices through UFS protocols, and the UFS devices 6520, 6620, 6720, 6820 and the UFS cards 6530, 6630, 6730, 6830 may be embodied by the memory system 110 illustrated in FIGS. 2. For example, in the UFS systems 6500, 6600, 6700, 6800, the UFS devices 6520, 6620, 6720, 6820 may be embodied in the form of the data processing system 6200, the SSD 6300 or the eMMC 6400 described with reference to FIGS. 18 to 20, and the UFS cards 6530, 6630, 6730, 6830 may be embodied in the form of the memory card system 6100 described with reference to FIG. 17.

Furthermore, in the UFS systems 6500, 6600, 6700, 6800, the hosts 6510, 6610, 6710, 6810, the UFS devices 6520, 6620, 6720, 6820 and the UFS cards 6530, 6630, 6730, 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720, 6820 and the UFS cards 6530, 6630, 6730, 6830 may communicate with each other through any of various protocols other than the UFS protocol, for example, an UFDs, a MMC, a SD, a mini-SD, and a micro-SD.

Figure 21:
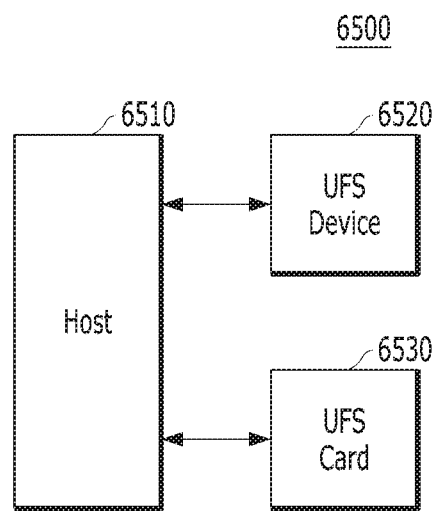

In the UFS system 6500 illustrated in FIG. 21, each of the host 6510, the UFS device 6520 and the UFS card 6530 may include UniPro. The host 6510 may perform a switching operation to communicate with the UFS device 6520 and the UFS card 6530. In particular, the host 6510 may communicate with the UFS device 6520 or the UFS card 6530 through link layer switching, for example, L3 switching at the UniPro. The UFS device 6520 and the UFS card 6530 may communicate with each other through link layer switching at the UniPro of the host 6510. In the illustrated embodiment, one UFS device 6520 and one UFS card 6530 are connected to the host 6510. However, in another embodiment, a plurality of UFS devices and UFS cards may be connected in parallel or in the form of a star to the host 6410. A star formation is an arrangement in which a single device is coupled with plural devices for centralized operation. A plurality of UFS cards may be connected in parallel or in the form of a star to the UFS device 6520 or connected in series or in the form of a chain to the UFS device 6520.

Figure 22:
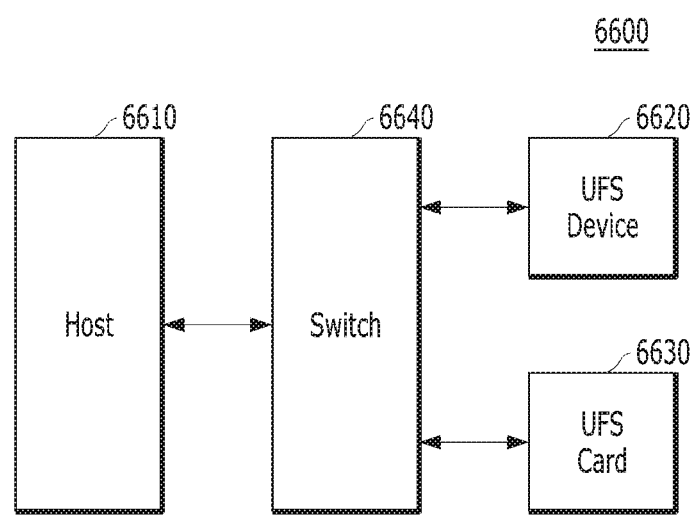

In the UFS system 6600 illustrated in FIG. 22, each of the host 6610, the UFS device 6620 and the UFS card 6630 may include UniPro. The host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the illustrated embodiment, one UFS device 6620 and one UFS card 6630 are connected to the switching module 6640. However, in another embodiment, a plurality of UFS devices and UFS cards may be connected in parallel or in the form of a star to the switching module 6640. A plurality of UFS cards may be connected in series or in the form of a chain to the UFS device 6620.

Figure 23:
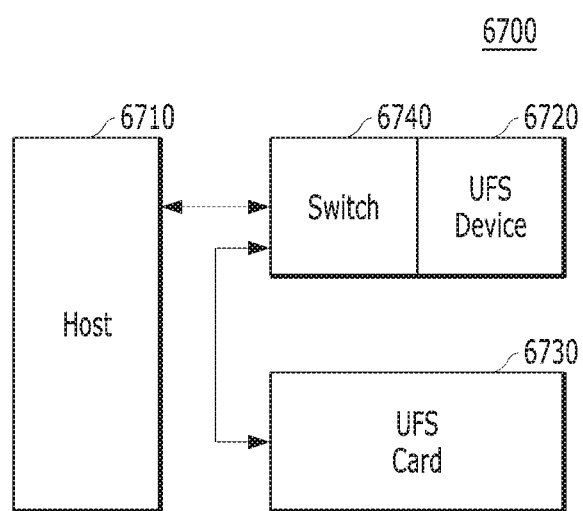

In the UFS system 6700 illustrated in FIG. 23, each of the host 6710, the UFS device 6720 and the UFS card 6730 may include UniPro. The host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through link layer switching of the switching module 6740 at the UniPro. The switching module 6740 may be integrated as one module with the UFS device 6720 inside or outside the UFS device 6720. In the illustrated embodiment, one UFS device 6720 and one UFS card 6730 are connected to the switching module 6740. However, in another embodiment, a plurality of modules, each including the switching module 6740 and the UFS device 6720, may be connected in parallel or in the form of a star to the host 6710. In another example, a plurality of modules may be connected in series or in the form of a chain to each other. Furthermore, a plurality of UFS cards may be connected in parallel or in the form of a star to the UFS device 6720.

Figure 24:
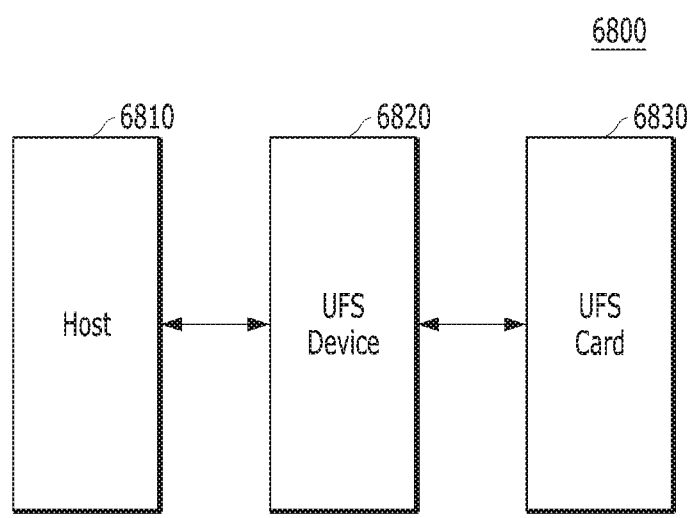

In the UFS system 6800 illustrated in FIG. 24, each of the host 6810, the UFS device 6820 and the UFS card 6830 may include M-PHY and UniPro. The UFS device 6820 may perform a switching operation to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. The host 6810 and the UFS card 6830 may communicate with each other through target ID switching between the M-PHY and UniPro modules of the UFS device 6820. In the illustrated embodiment, one UFS device 6820 is connected to the host 6810 and one UFS card 6830 is connected to the UFS device 6820. However, in another embodiment, a plurality of UFS devices may be connected in parallel or in the form of a star to the host 6810, or connected in series or in the form of a chain to the host 6810. A plurality of UFS cards may be connected in parallel or in the form of a star to the UFS device 6820, or connected in series or in the form of a chain to the UFS device 6820.

Figure 25:
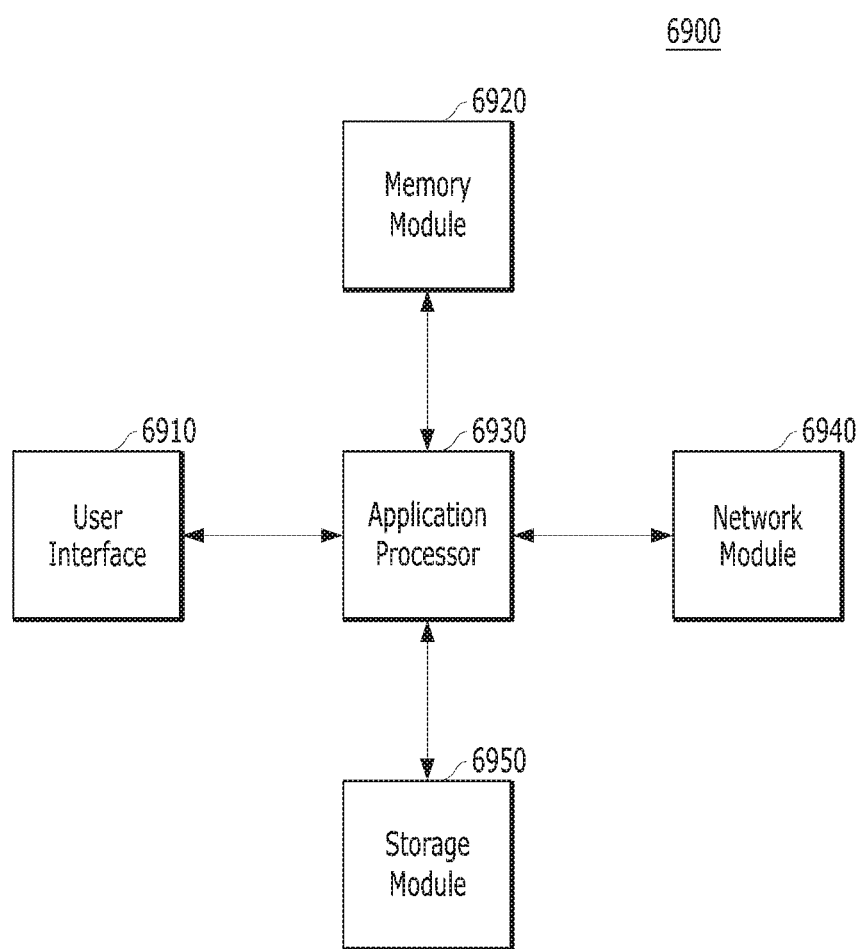

FIG. 25 is a diagram schematically illustrating another example of the data processing system including the memory system in accordance with an embodiment of the present invention. FIG. 25 is a diagram schematically illustrating a user system to which the memory system may be applied.

Referring to FIG. 25, the user system 6900 may include an application processor 6930, a memory module 6920, a network module 6940, a storage module 6950 and a user interface 6910.

More specifically, the application processor 6930 may drive components in the user system 6900, for example, an OS, and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as a DRAM, a SDRAM, a DDR SDRAM, a DDR2 SDRAM, a DDR3 SDRAM, a LPDDR SDRAM, a LPDDR2 SDRAM or a LPDDR3 SDRAM or a nonvolatile RAM such as a PRAM, a ReRAM, a MRAM or a FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices, particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, a NOR flash and a 3D NAND flash, and provided as a removable storage medium such as a memory card or external drive of the user system 6900. The storage module 6950 may correspond to the memory system 110 described with reference to FIG. 2. Furthermore, the storage module 6950 may be embodied as an SSD, an eMMC and an UFS as described above with reference to FIGS. 19 to 24.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIG. 2 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

In accordance with embodiments of the present invention, the memory system may effectively perform a garbage collection operation by dynamically changing an operation time of the garbage collection operation according to a workload.

While the present invention has been illustrated and described with respect to the specific embodiments, it will be apparent to those skilled in the art in light of the present disclosure that various changes and modifications may be made without departing from the spirit and scope of the invention as defined in the following claims.

What is claimed is:

1. A memory system comprising:
   a memory device including super memory blocks each having a plurality of memory blocks;
   a garbage collection operation time manager suitable for determining an operation time of a garbage collection operation according to a number of valid pages, distribution of the valid pages and distribution of logical addresses of the valid pages; and
   a garbage collection operation module suitable for controlling the memory device to perform the garbage collection operation within the determined operation time,
   wherein the distribution of the valid pages is indicative of a number of indexes to which valid pages in a victim super memory block belong.

2. The memory system of claim 1, wherein the garbage collection operation time manager lengthens the operation time in proportion to the number of the valid pages.

3. The memory system of claim 1, wherein the garbage collection operation time manager lengthens the operation time in proportion to the number of indexes.

4. The memory system of claim 1, wherein the distribution of logical addresses of the valid pages is indicative of a number of map segments to which logical addresses of the valid pages included in a victim super memory block belong.

5. The memory system of claim 4, wherein the garbage collection operation time manager lengthens the operation time in proportion to the number of map segments.

6. The memory system of claim 4, wherein the map segments represent groups of a plurality of logical addresses, the groups being formed by dividing logical addresses of pages by a select number.

7. The memory system of claim 1, wherein the victim super memory block includes a smaller number of the valid pages than a threshold.

8. The memory system of claim 1, wherein each of the indexes represents a group of pages disposed at a row within the super memory block.

9. The memory system of claim 8, wherein the memory device reads data programmed in all pages of a single index during a single read operation.

10. An operating method of a memory system, the operating method comprising:
    determining an operation time of a garbage collection operation according to a number of valid pages, distribution of the valid pages and distribution of logical addresses of the valid pages; and
    controlling the memory device to perform the garbage collection operation within the determined operation time,
    wherein the distribution of the valid pages is indicative of a number of indexes to which valid pages included in a victim super memory block belong.

11. The operating method of claim 10, wherein, in the determining operation, the operation time is determined to be longer as the number of the valid pages increases, the operation time being proportional to the number of the valid pages.

12. The operating method of claim 10, wherein, in the determining operation, the operation time is determined to be longer as the number of indexes increases, the operation time being proportional to the number of the indexes.

13. The operating method of claim 10, wherein the distribution of logical addresses of the valid pages is indicative of a number of map segments to which logical addresses of the valid pages included in a victim super memory block belong.

14. The operating method of claim 13, wherein, in the determining operation, the operation time is determined to be longer as the number of map segments increases, the operation time being proportional to the number of map segments.

15. The operating method of claim 13, wherein the map segments represent groups of a plurality of logical addresses, the groups being formed by dividing logical addresses of pages by a select number.

16. The operating method of claim 10, wherein the victim super memory block includes a smaller number of the valid pages than a threshold.

17. The operating method of claim 10, wherein each of the indexes represents a group of pages disposed at a row within the super memory block.

18. The operating method of claim 17, wherein the garbage collection operation step reads data programmed in all pages of a single index during a single read operation.

* * * * *